(12) United States Patent
Hyatt et al.

(10) Patent No.: US 11,467,885 B2
(45) Date of Patent: Oct. 11, 2022

(54) TECHNOLOGIES FOR MANAGING A LATENCY-EFFICIENT PIPELINE THROUGH A NETWORK INTERFACE CONTROLLER

(71) Applicant: Intel Corporation, Santa Clara, CA (US)

(72) Inventors: Ronen Hyatt, Haifa (IL); Mark Debbage, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 849 days.

(21) Appl. No.: 15/859,394

(22) Filed: Dec. 30, 2017

(65) Prior Publication Data

US 2019/0068509 A1 Feb. 28, 2019

Related U.S. Application Data

(60) Provisional application No. 62/584,401, filed on Nov. 10, 2017.

(30) Foreign Application Priority Data

Aug. 30, 2017 (IN) .............................. 201741030632

(51) Int. Cl.
*G06F 9/50* (2006.01)
*H04L 41/5025* (2022.01)
(Continued)

(52) U.S. Cl.
CPC ........ *G06F 9/5088* (2013.01); *B25J 15/0014* (2013.01); *G06F 1/183* (2013.01);
(Continued)

(58) Field of Classification Search
CPC .................................................... G06F 9/5088
(Continued)

(56) References Cited

U.S. PATENT DOCUMENTS 7,552,323 B2 * 6/2009 Shay ...................... H04L 63/02
713/153
7,738,900 B1 6/2010 Manroa et al.
(Continued)

OTHER PUBLICATIONS

International search report for PCT application No. PCT/US2018/044363, dated Nov. 5, 2018 (3 pages).
(Continued)

*Primary Examiner* — Dant B Shaifer Harriman
(74) *Attorney, Agent, or Firm* — Compass IP Law PC

(57) ABSTRACT

Technologies for processing network packets a compute device with a network interface controller (NIC) that includes a host interface, a packet processor, and a network interface. The host interface is configured to receive a transaction from the compute engine, wherein the transaction includes latency-sensitive data, determine a context of the latency-sensitive data, and verify the latency-sensitive data against one or more server policies as a function of the determined context. The packet processor is configured to identify a trust associated with the latency-sensitive data, determine whether to verify the latency-sensitive data against one or more network policies as a function of the identified trust, apply the one or more network policies, and encapsulate the latency-sensitive data into a network packet. The network interface is configured to transmit the network packet via an associated Ethernet port of the NIC. Other embodiments are described herein.

29 Claims, 20 Drawing Sheets

(51) Int. Cl.

| | |
|---|---|
| *G06F 11/34* | (2006.01) |
| *B25J 15/00* | (2006.01) |
| *G06F 1/18* | (2006.01) |
| *G06F 1/20* | (2006.01) |
| *G06F 15/78* | (2006.01) |
| *H05K 7/14* | (2006.01) |
| *H05K 7/18* | (2006.01) |
| *H05K 7/20* | (2006.01) |
| *H04L 67/1008* | (2022.01) |
| *H04L 41/0896* | (2022.01) |
| *G06N 3/063* | (2006.01) |
| *H04L 41/5019* | (2022.01) |
| *H04L 41/14* | (2022.01) |
| *G06F 21/10* | (2013.01) |
| *G06Q 30/02* | (2012.01) |
| *G06F 9/44* | (2018.01) |
| *G06F 13/40* | (2006.01) |
| *G06Q 10/06* | (2012.01) |
| *H04L 49/40* | (2022.01) |
| *G06F 9/48* | (2006.01) |
| *H04L 9/40* | (2022.01) |

(52) U.S. Cl.
CPC ................ *G06F 1/20* (2013.01); *G06F 9/505* (2013.01); *G06F 11/3442* (2013.01); *G06F 15/7807* (2013.01); *G06F 15/7867* (2013.01); *H04L 41/5025* (2013.01); *H04L 67/1008* (2013.01); *H05K 7/1489* (2013.01); *H05K 7/18* (2013.01); *H05K 7/20209* (2013.01); *H05K 7/20736* (2013.01); *G06F 9/44* (2013.01); *G06F 9/4856* (2013.01); *G06F 9/5061* (2013.01); *G06F 13/4022* (2013.01); *G06F 21/105* (2013.01); *G06F 2200/201* (2013.01); *G06N 3/063* (2013.01); *G06Q 10/0631* (2013.01); *G06Q 30/0283* (2013.01); *H04L 41/0896* (2013.01); *H04L 41/14* (2013.01); *H04L 41/5019* (2013.01); *H04L 49/40* (2013.01); *H04L 63/0428* (2013.01); *H05K 7/1498* (2013.01)

(58) Field of Classification Search
USPC .......................................................... 370/235
See application file for complete search history.

(56) References Cited

U.S. PATENT DOCUMENTS

| | | | |
|---|---|---|---|
| 2003/0126468 A1* | 7/2003 | Markham | H04L 63/164 |
| | | | 726/13 |
| 2004/0165588 A1* | 8/2004 | Pandya | H04L 63/0218 |
| | | | 370/389 |
| 2014/0059221 A1* | 2/2014 | Pope | H04L 47/50 |
| | | | 709/225 |
| 2014/0100807 A1 | 4/2014 | Rosenblatt et al. | |
| 2015/0033222 A1 | 1/2015 | Hussain et al. | |
| 2016/0173600 A1 | 6/2016 | Galles et al. | |
| 2017/0222947 A1* | 8/2017 | Johnsen | H04L 47/70 |
| 2022/0086083 A1* | 3/2022 | Maino | H04L 45/64 |

OTHER PUBLICATIONS

Written opinion for PCT application No. PCT/US2018/044363, dated Novembers, 2018 (8 pages).

\* cited by examiner

TECHNOLOGIES FOR MANAGING A LATENCY-EFFICIENT PIPELINE THROUGH A NETWORK INTERFACE CONTROLLER

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

In present packet-switched network architectures, data is transmitted in the form of network packets between compute devices and/or device components at a rapid pace. At a high level, data is packetized into a network packet, which is transmitted by a network interface controller (NIC) of one network compute device and received by a NIC of another network compute device. Oftentimes, applications (e.g., enterprise applications) running over such packet switched networks rely on Ethernet as their data link and are generally not latency sensitive. Accordingly, certain performance metrics (e.g., response time, operations per second) of such applications are generally unaffected by an increase in link latency, such as may be seen through an Ethernet-based NIC. Consequently, Ethernet-based NIC vendors typically do not optimize for latency, rather choosing to focus and differentiate on features and bandwidth. As a result, latency-sensitive applications (e.g., high performance computing (HPC) applications, large-scale simulations, machine learning workloads, etc.) typically rely on specialized networks, such as Infiniband™ or other proprietary solutions. However, present techniques do not accommodate the rising popularity of such latency-sensitive applications and distributed services in the cloud, especially on the Ethernet-based NICs.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
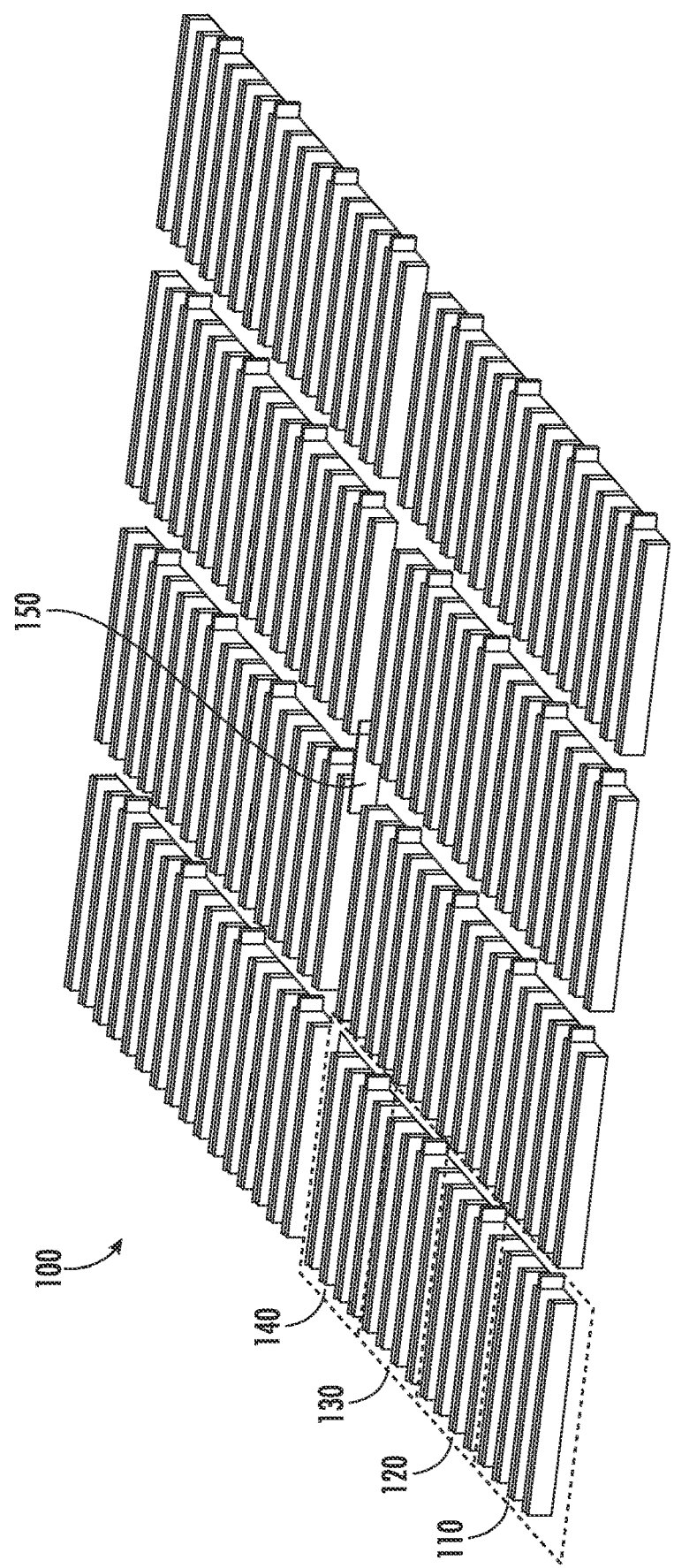
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
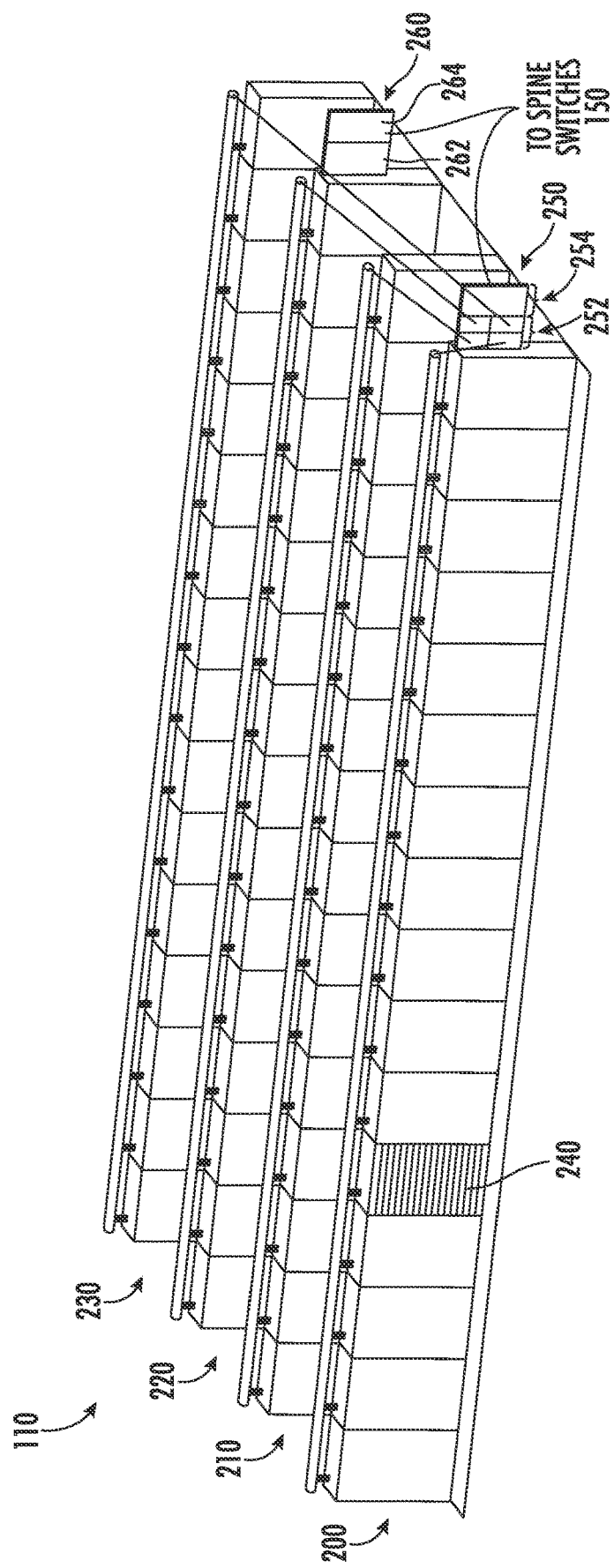
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
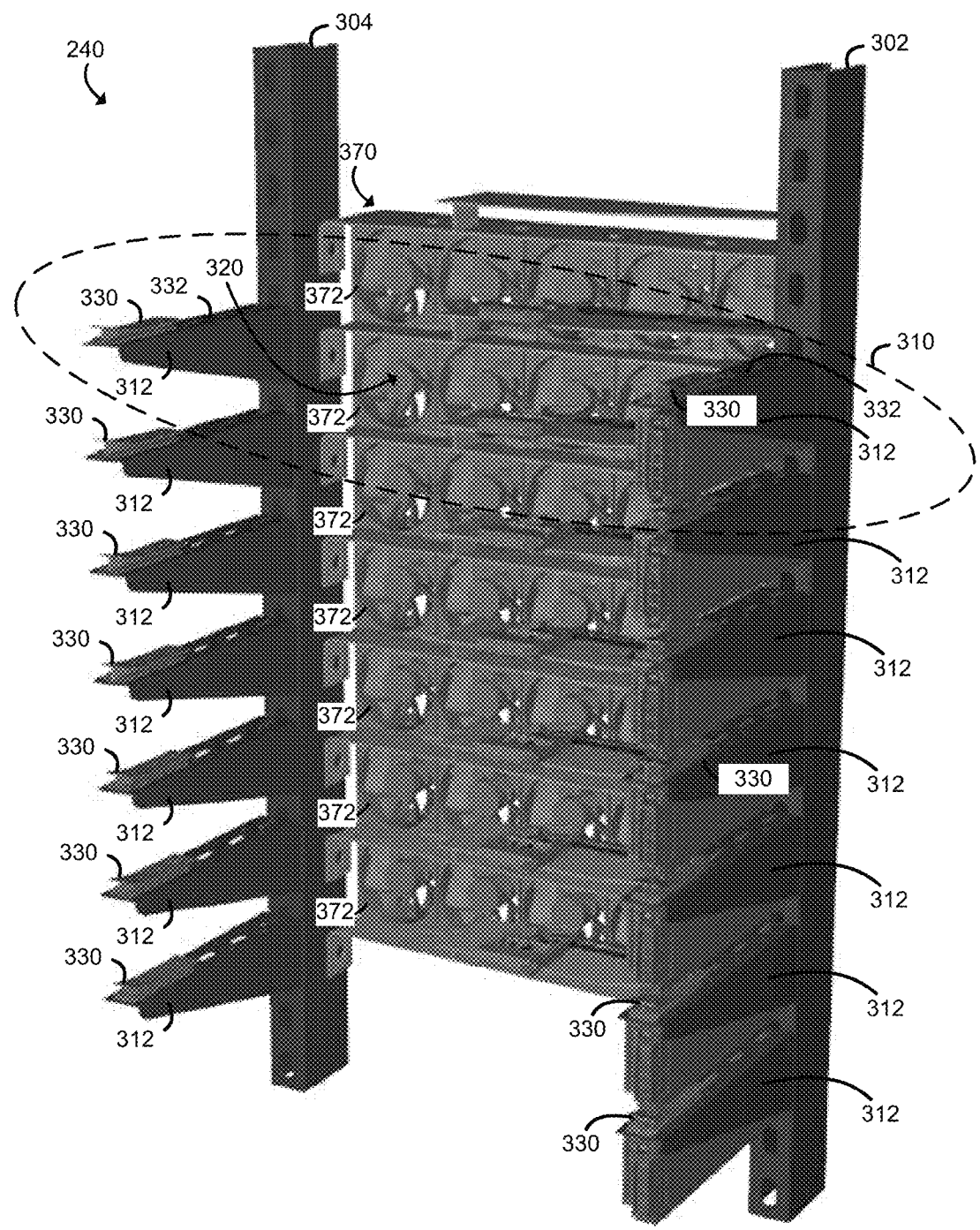
FIG. 3 is a perspective view of at least one embodiment of a rack that may be included in the pod of FIG. 2.
Figure 4:
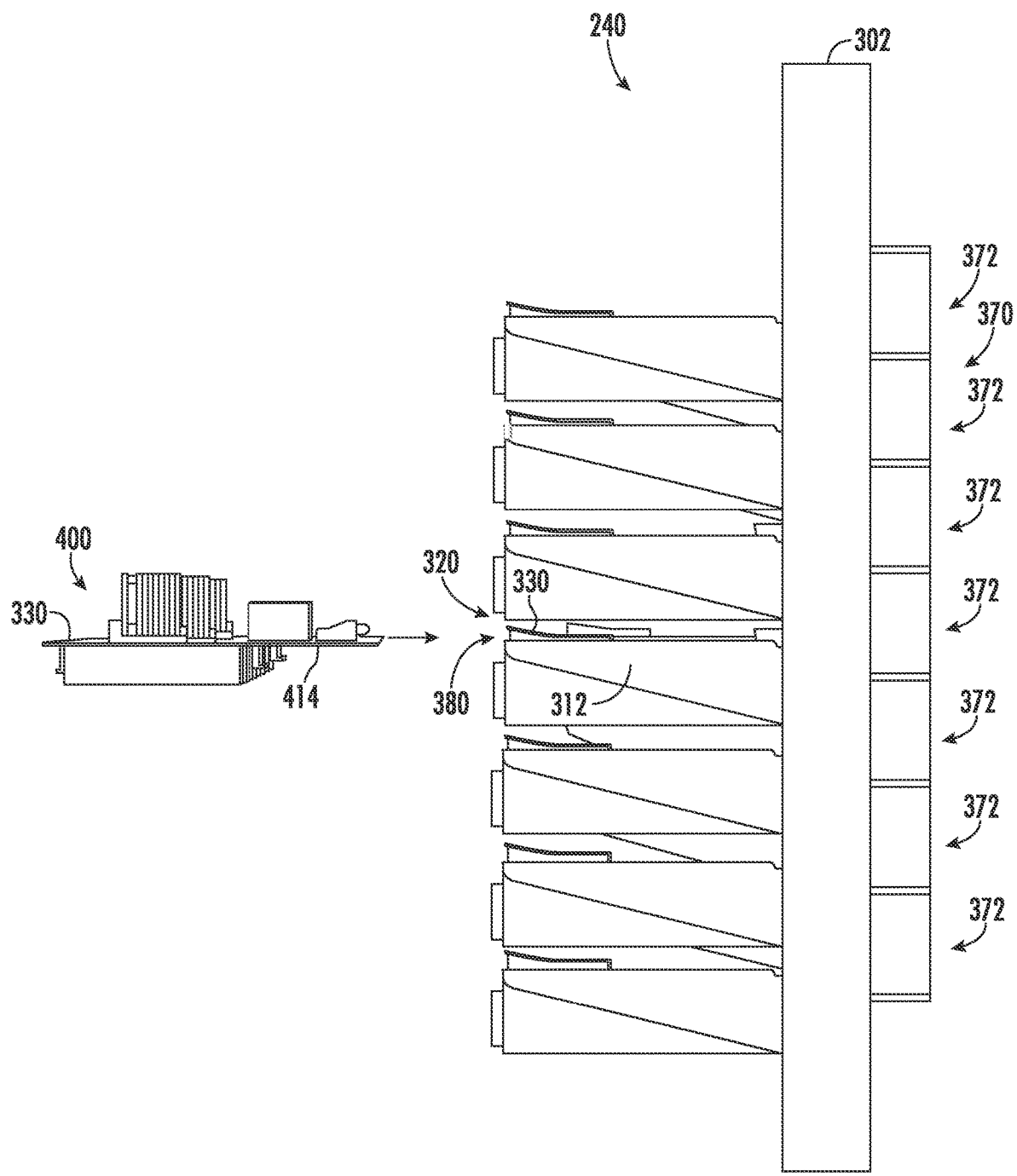
FIG. 4 is a side plan elevation view of the rack of FIG. 3.
Figure 5:
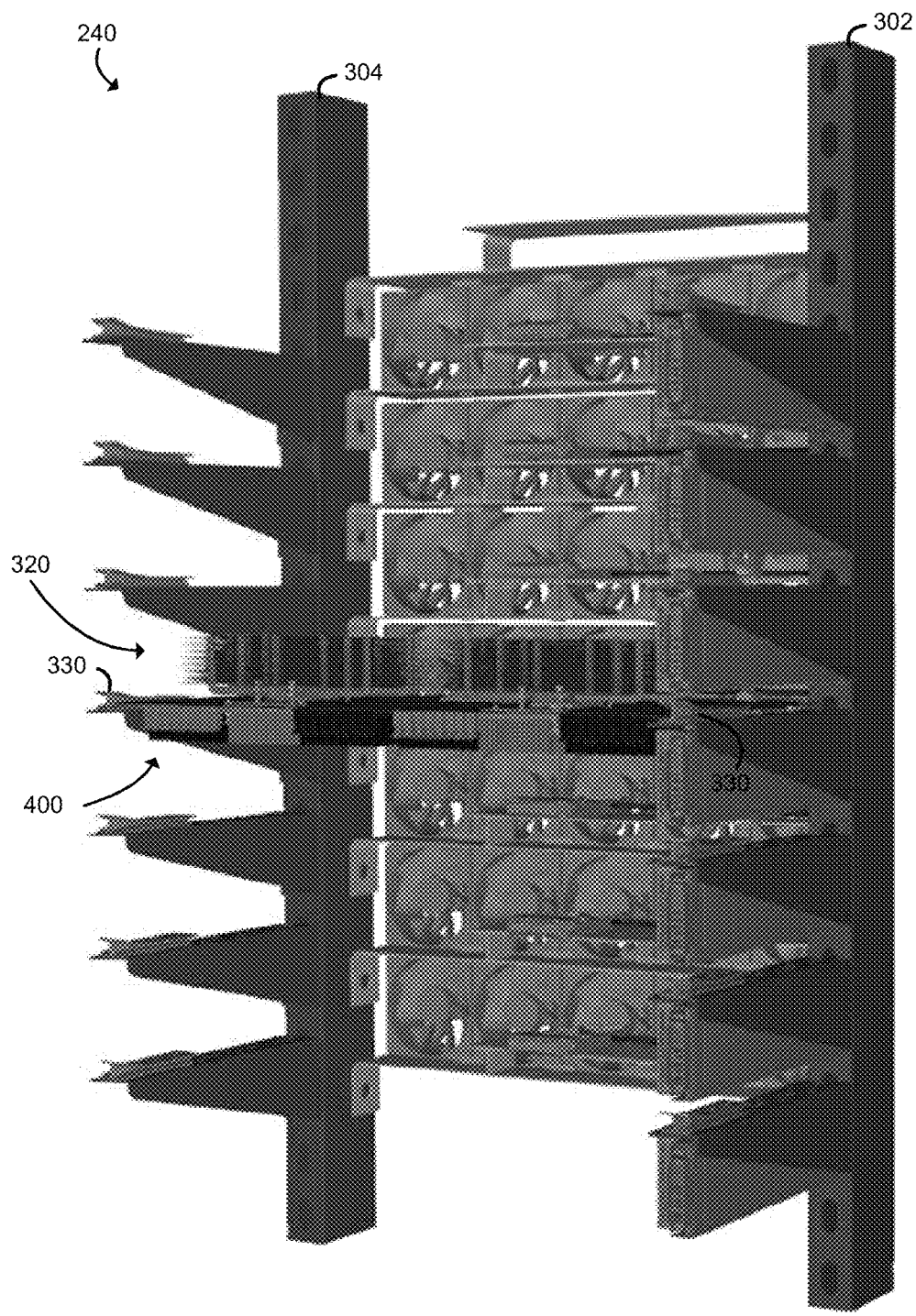
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
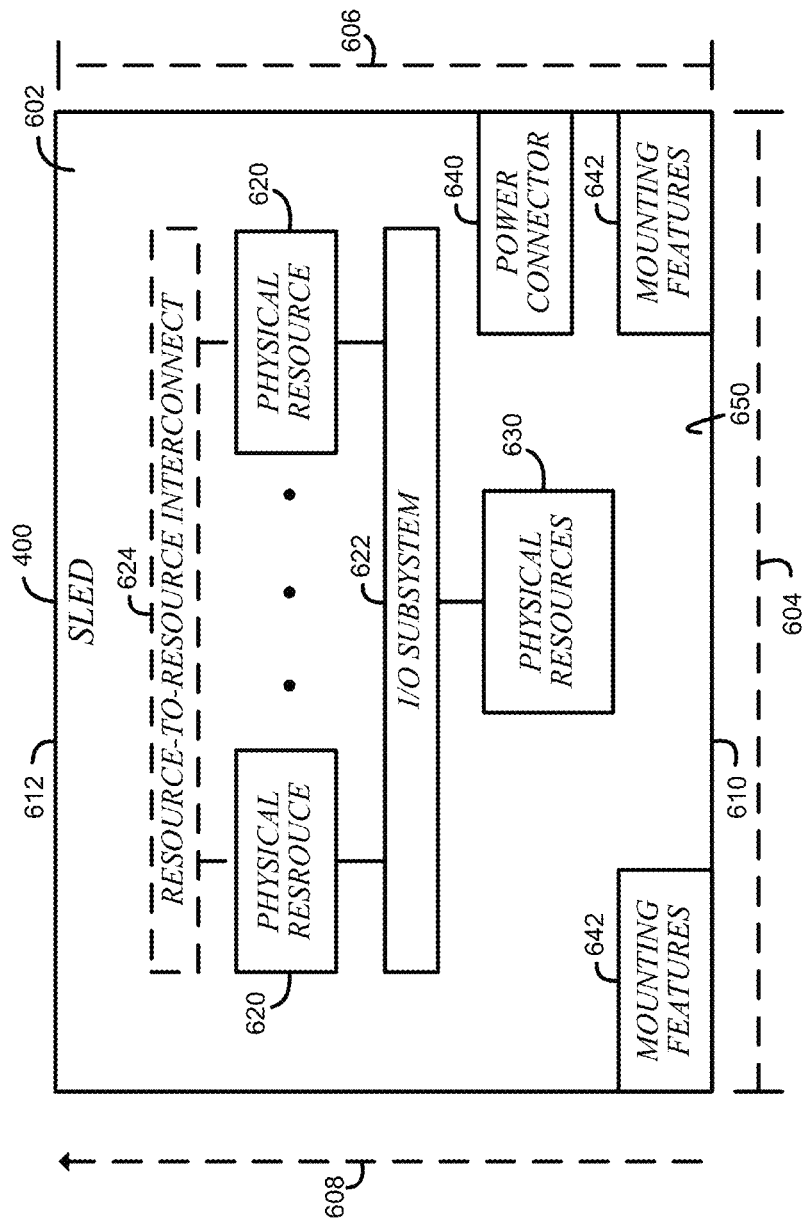
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment.

The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
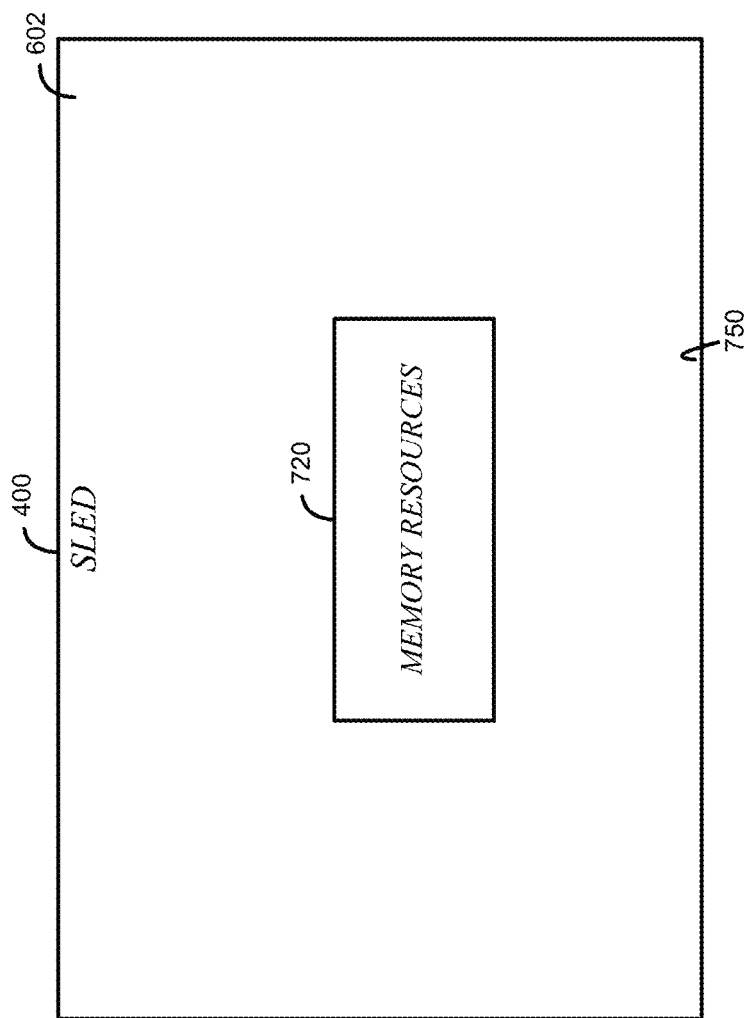
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
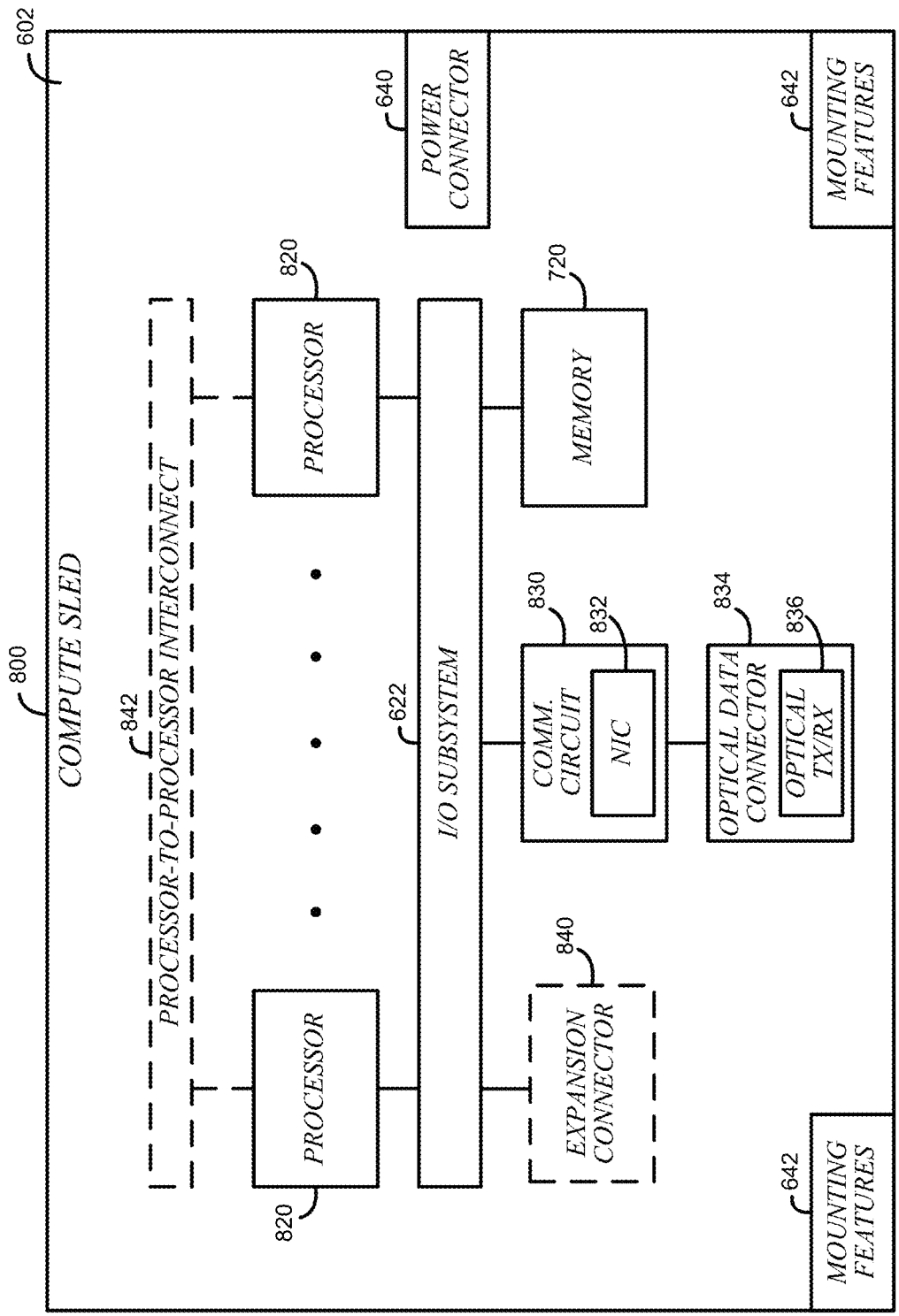
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
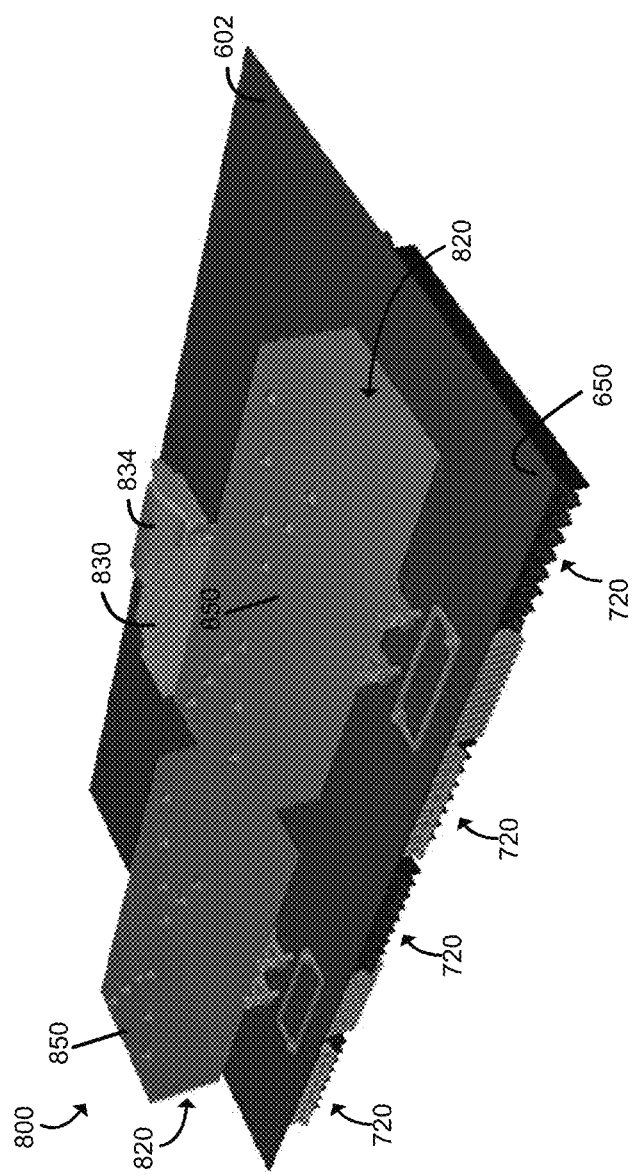
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
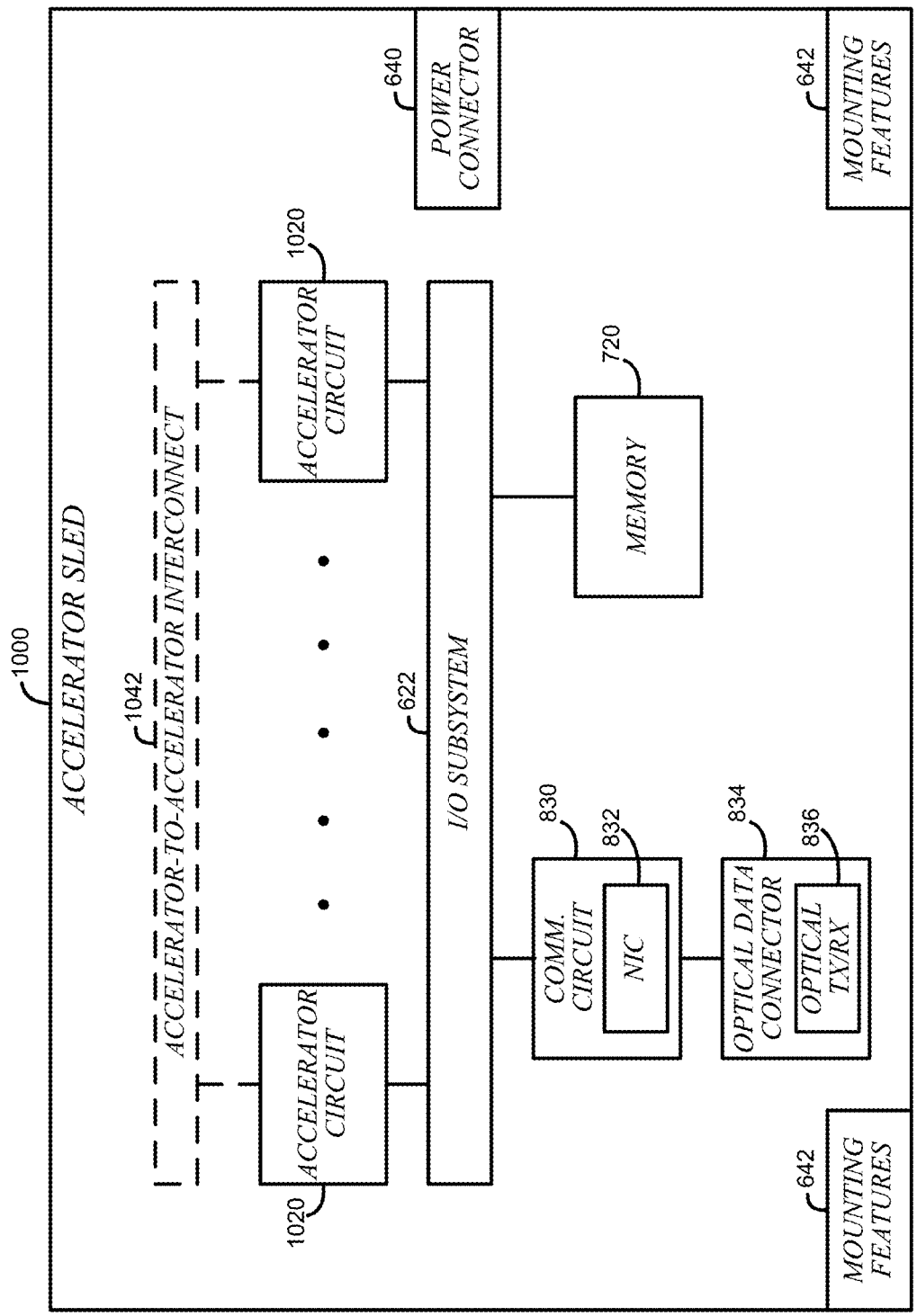
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
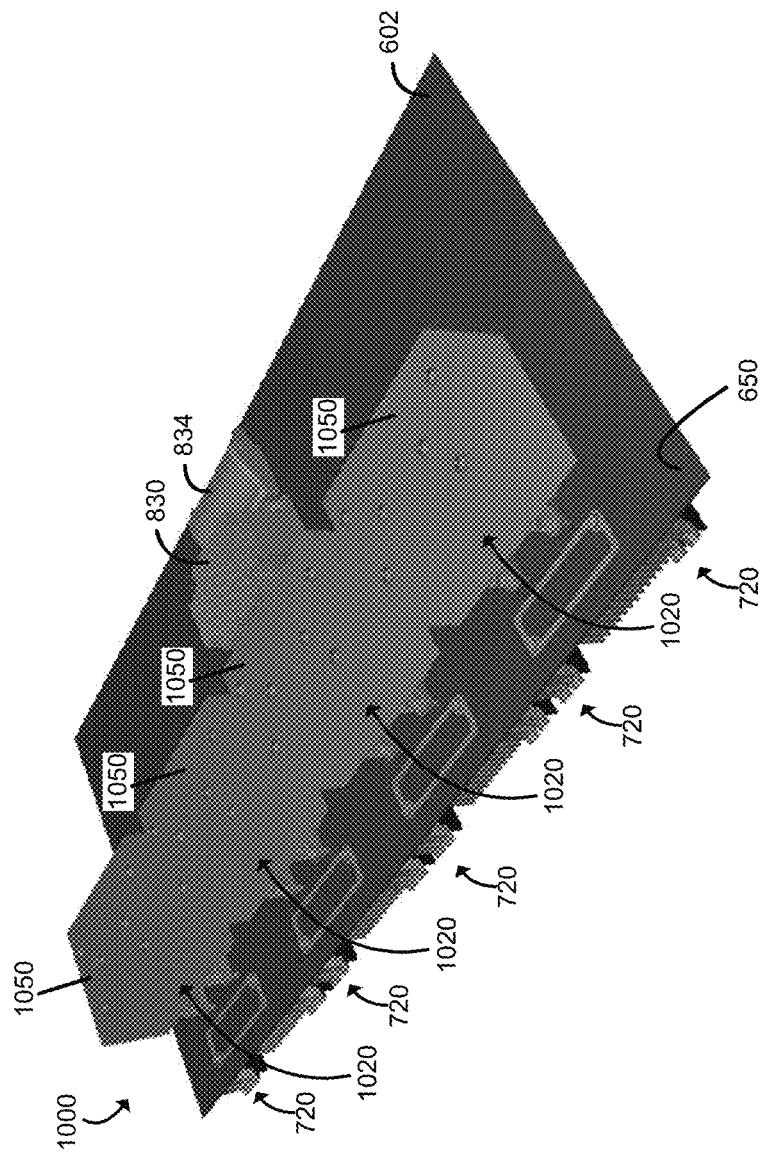
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
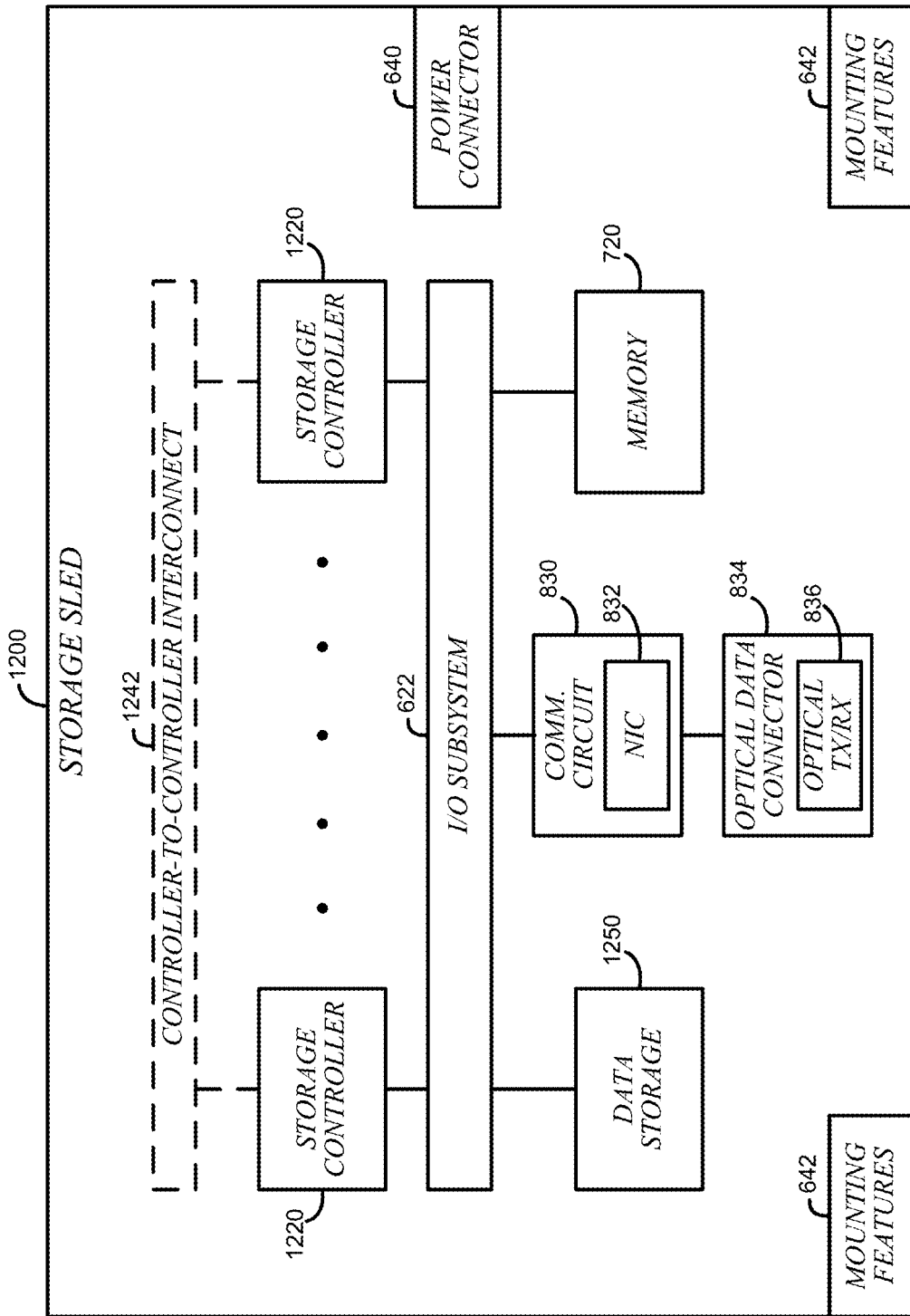
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
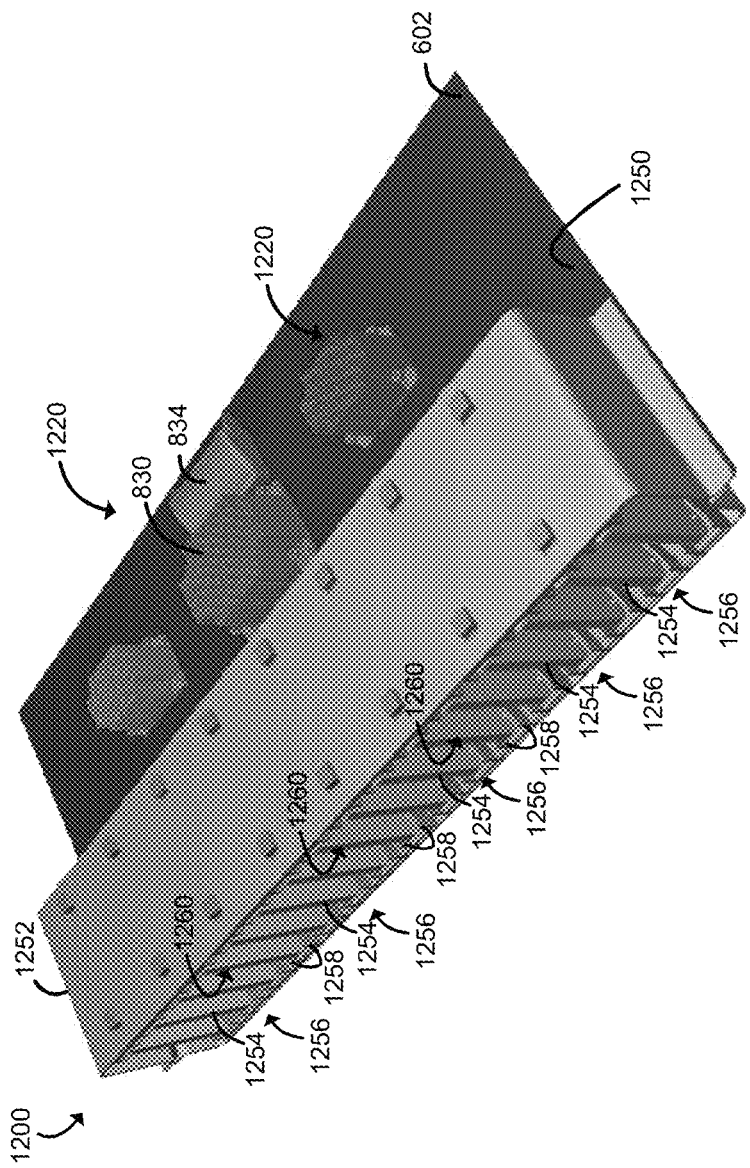
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
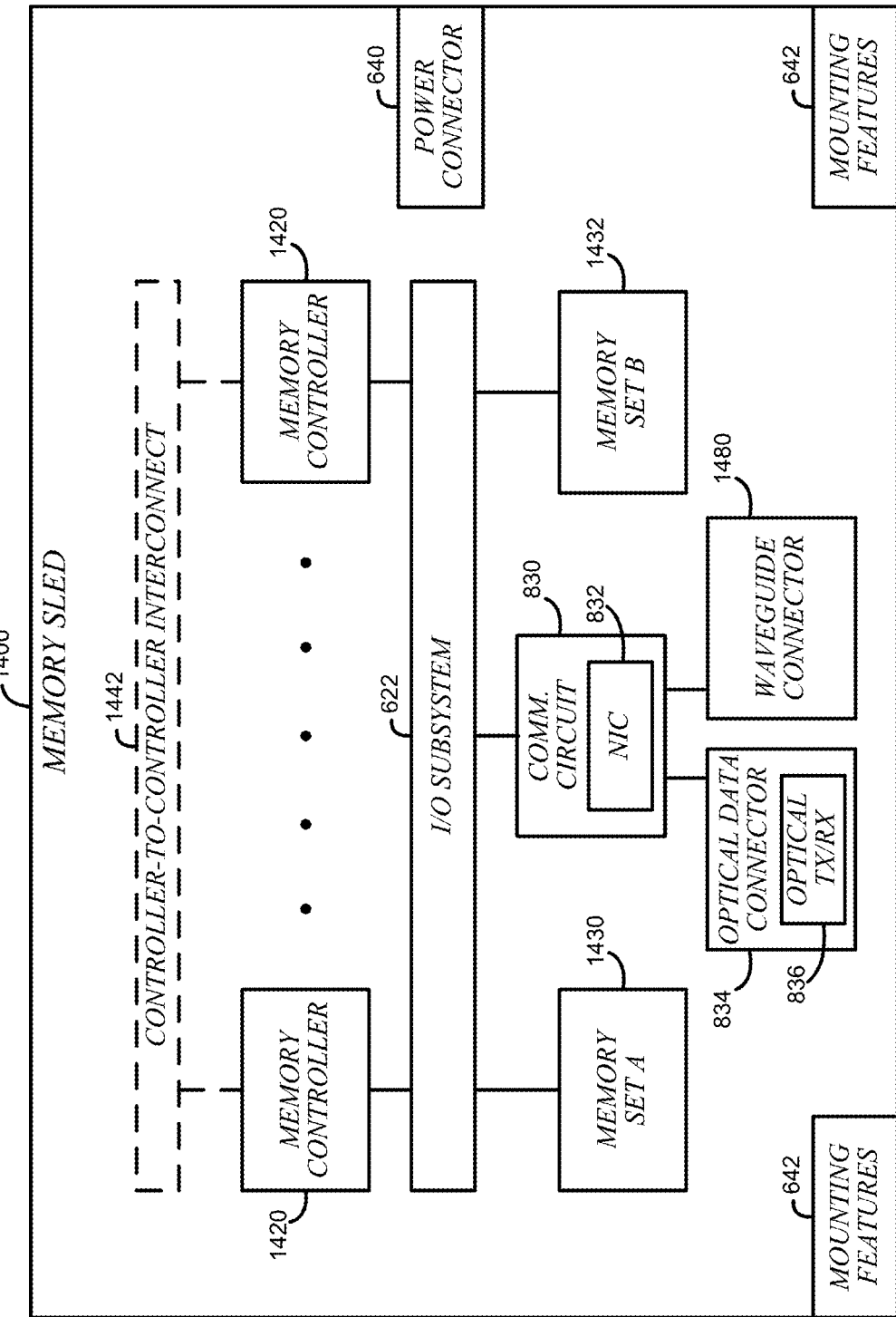
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
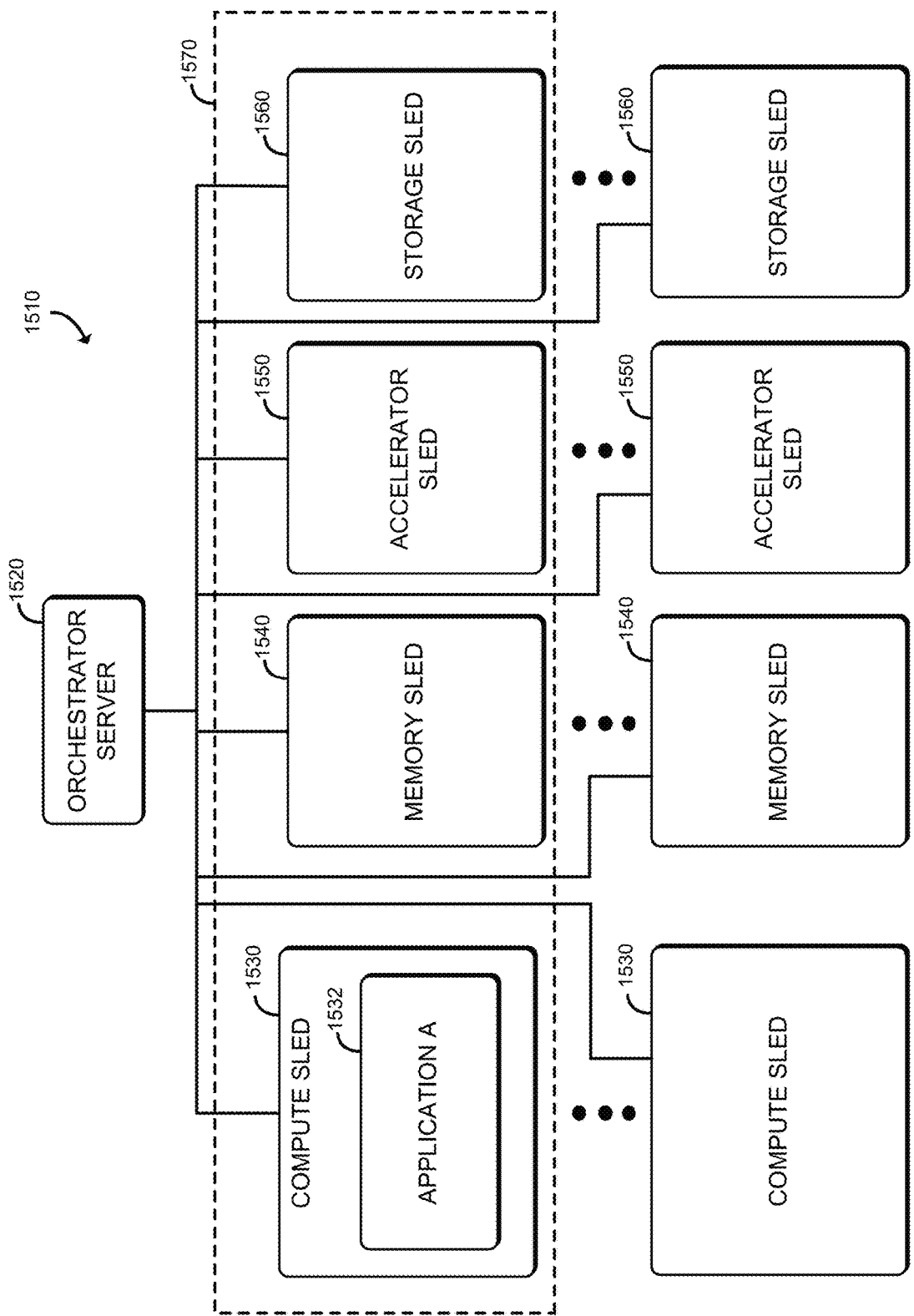
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
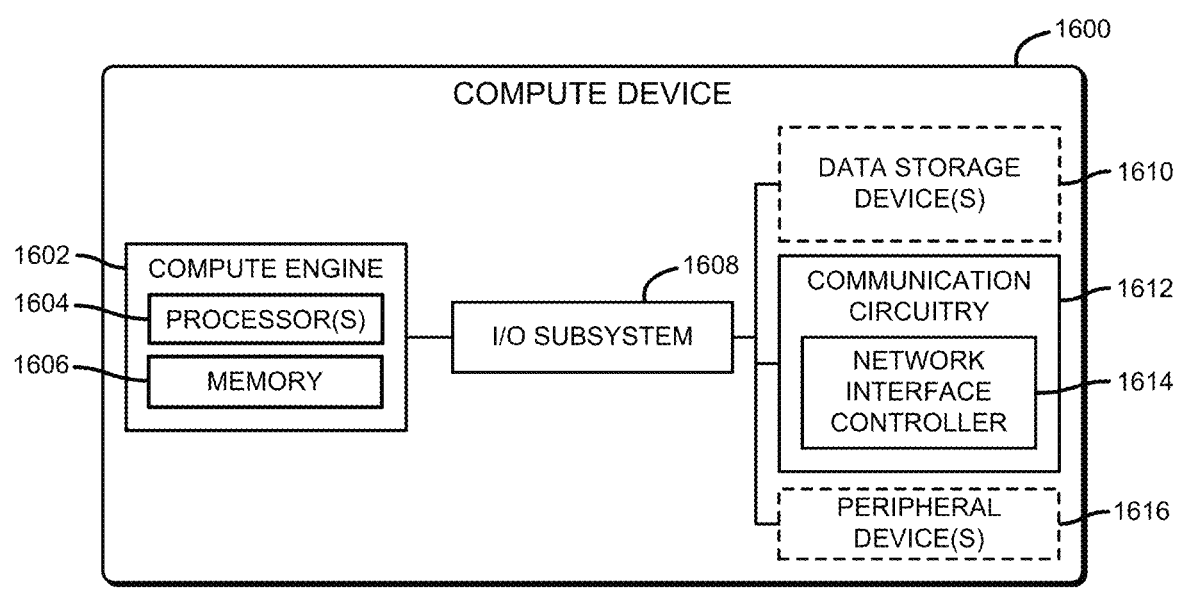
FIG. 16 is a simplified block diagram of at least one embodiment of a compute device for managing a latency-efficient pipeline through a network interface controller (NIC) of the compute device.

Referring now to FIG. 16, an illustrative compute device 1600 (e.g., sled 400) for managing a fast path through a network interface controller (NIC) includes various components for performing the functions described herein, including a NIC 1614. In use, as described in further detail below, the NIC 1614 establishes a pathway through the NIC 1614 which is usable to provide a latency-efficient pipeline (i.e., a fast path pipeline) for network traffic to be transmitted from the compute device 1600 (i.e., a host interface of the compute device 1600) to another compute device 1600 (i.e., across the wire and/or other physical medium), via the NIC 1614.

To do so, as will be described in further detail below, the NIC 1614 is configured to manage a virtualized transmit buffer (see, e.g., the illustrative transmit buffer 1804 of FIG. 18), which allows flexible partitioning to virtual functions (VFs), virtual machines (VMs), containers, and physical functions (PFs), while preserving and enforcing protection and isolation between different software applications using resources of the NIC 1614. Additionally, the NIC 1614 is configured to enforce various server policies against data received from the virtualized transmit buffer (i.e., a virtualization and isolation policy enforcement phase) before parsing the data and performing a latency-aware workload differentiation on the data to determine whether there is an intrinsic or extrinsic trust associated with the data. Further, upon performing the necessary operations as a function of the trust associated with the data, the NIC 1614 is configured to perform a latency-aware quality of service (QoS) differentiation to identify whether the data (i.e., packetized data) should be place directly on the wire for transmission to another compute device 1600 or placed in a transmission queue for scheduling by a traffic manager (see, e.g., the traffic manager 1712) of the NIC.

The compute device 1600 may be embodied as a server (e.g., a stand-alone server, a rack server, a blade server, etc.), a compute node, a storage node, a switch (e.g., a disaggregated switch, a rack-mounted switch, a standalone switch, a fully managed switch, a partially managed switch, a full-duplex switch, and/or a half-duplex communication mode enabled switch), a router, and/or a sled in a data center (e.g., sled 400 of data center 100 discussed above), any of which may be embodied as one or more physical and/or virtual devices. As shown in FIG. 16, the illustrative compute device 1600 includes a compute engine 1602, an input/output (I/O) subsystem 1608, one or more data storage devices 1610, communication circuitry 1612, and, in some embodiments, one or more peripheral devices 1616. Of course, in other embodiments, the compute device 1600 may include other or additional components, such as those commonly found in a compute device (e.g., a power supply, cooling component(s), a graphics processing unit (GPU), etc.). It should be appreciated that they types of components may depend on the type and/or intended use of the compute device 1600. For example, in embodiments in which the compute device 1600 is embodied as a compute sled in a data center, the compute device 1600 may not include the data storage devices. Additionally, in some embodiments, one or more of the illustrative components may be incorporated in, or otherwise form a portion of, another component.

The compute engine 1602 may be embodied as any type of device or collection of devices capable of performing various compute functions described below. In some embodiments, the compute engine 1602 may be embodied as a single device such as an integrated circuit, an embedded system, an FPGA, a system-on-a-chip (SoC), or other integrated system or device. As illustratively shown, the compute engine 1602 includes or may otherwise be embodied as a processor 1604 and a memory 1606. The processor 1604 may be embodied as any type of processor capable of performing the functions described herein. For example, the processor 1604 may be embodied as one or more single or multi-core processors, a microcontroller, or other processor or processing/controlling circuit. In some embodiments, the processor 1604 may be embodied as, include, or otherwise be coupled to an FPGA, an application specific integrated circuit (ASIC), reconfigurable hardware or hardware circuitry, or other specialized hardware to facilitate performance of the functions described herein.

The memory 1606 may be embodied as any type of volatile (e.g., dynamic random access memory (DRAM), etc.) or non-volatile memory or data storage capable of performing the functions described herein. It should be appreciated that the memory 1606 may include main memory (i.e., a primary memory) and/or cache memory (i.e., memory that can be accessed more quickly than the main memory). Volatile memory may be a storage medium that requires power to maintain the state of data stored by the medium. In some embodiments, all or a portion of the memory 1606 may be integrated into the processor 1604. In operation, the memory 1606 may store various software and data used during operation such as job request data, kernel map data, telemetry data, applications, programs, libraries, and drivers. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as Intel 3D XPoint™ memory, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

The compute engine 1602 is communicatively coupled to other components of the compute device 1600 via the I/O subsystem 1608, which may be embodied as circuitry and/or components to facilitate input/output operations with the compute engine 1602 (e.g., with the processor 1604 and/or the memory 1606) and other components of the compute device 1600. For example, the I/O subsystem 1608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1608 may form a portion of a SoC and be incorporated, along with one or more of the processor 1604, the memory 1606, and other components of the compute device 1600, into the compute engine 1602.

In some embodiments, the compute device 1600 may include one or more data storage devices 1610, which may be embodied as any type of devices configured for short-term or long-term storage of data such as, for example, memory devices and circuits, memory cards, hard disk drives, solid-state drives, or other data storage devices. Each data storage device 1610 may include a system partition that stores data and firmware code for the data storage device 1610. Additionally, each data storage device 1610 may also include an operating system partition that stores data files and executables for an operating system.

The communication circuitry 1612 may be embodied as any communication circuit, device, or collection thereof, capable of enabling network communications between the compute device 1600 and another compute device (e.g., a source compute device, a target compute device, a network computing device, etc.) over a network (not shown). Such a network may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Accordingly, the communication circuitry 1612 may be configured to use any one or more communication technology (e.g., wired or wireless communications) and associated protocols (e.g., Ethernet, Bluetooth®, Wi-Fi®, WiMAX, etc.) to effect such communication. As noted previously, the illustrative communication circuitry 1612 includes the NIC 1614, which may also be referred to as a smart NIC or an intelligent/smart host fabric interface (HFI), and is described in further detail in FIGS. 17 and 18. The NIC 1614 may be embodied as one or more add-in-boards, daughter cards, network interface cards, controller chips, chipsets, or other devices that may be used by the compute device 1600 to transmit/receive network communications to/from another compute device.

The peripheral device(s) 1616 may include any type of device that is usable to input information into the compute device 1600 and/or receive information from the compute device 1600. The peripheral devices 1616 may be embodied as any auxiliary device usable to input information into the compute device 1600, such as a keyboard, a mouse, a microphone, a barcode reader, an image scanner, etc., or output information from the compute device 1600, such as a display, a speaker, graphics circuitry, a printer, a projector, etc. It should be appreciated that, in some embodiments, one or more of the peripheral devices 1616 may function as both an input device and an output device (e.g., a touchscreen display, a digitizer on top of a display screen, etc.). It should be further appreciated that the types of peripheral devices 1616 connected to the compute device 1600 may depend on, for example, the type and/or intended use of the compute device 1600. Additionally or alternatively, in some embodiments, the peripheral devices 1616 may include one or more ports, such as a USB port, for example, for connecting external peripheral devices to the compute device 1600.

Figure 17:
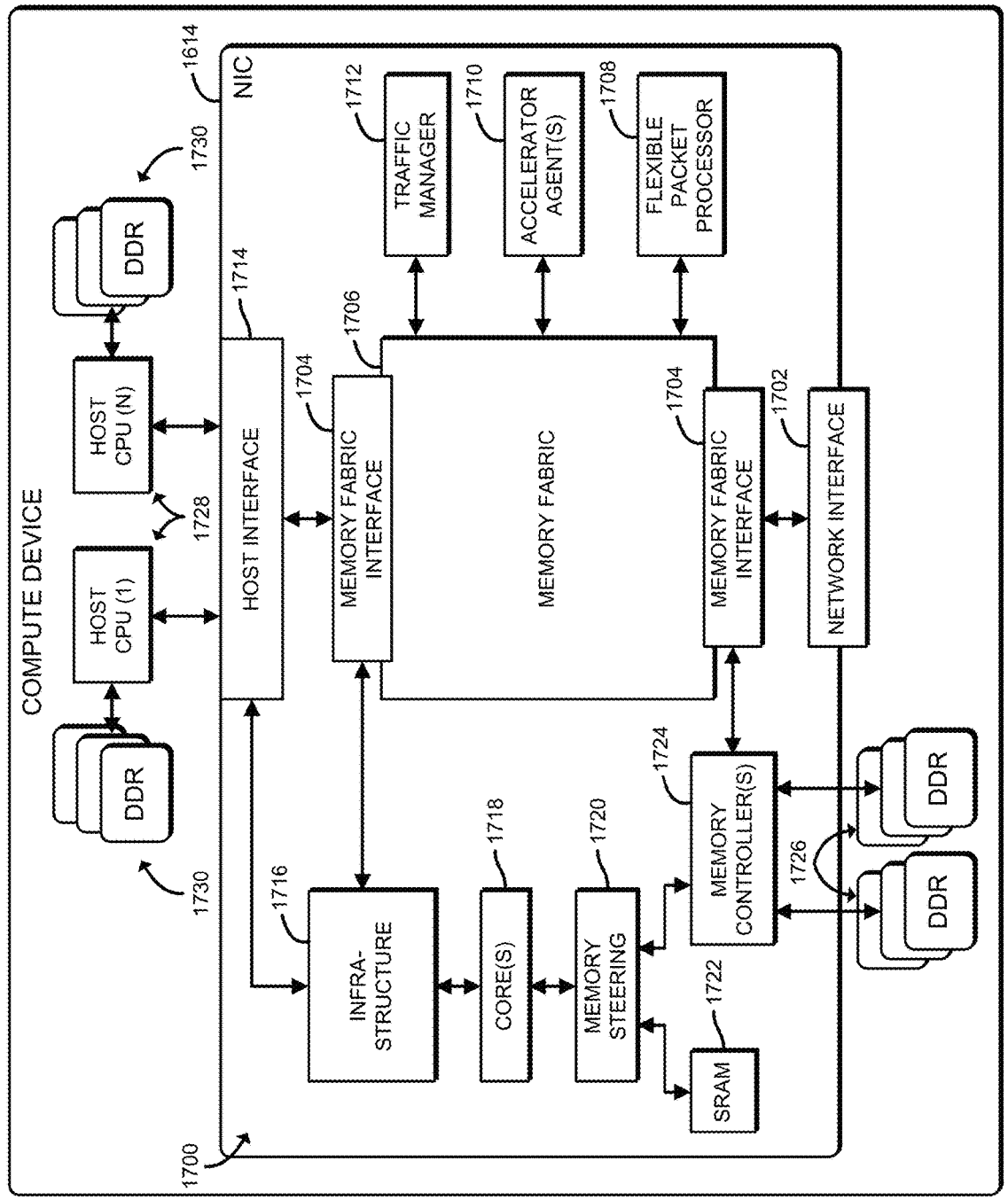
FIG. 17 is a simplified block diagram of at least one embodiment of an environment that may be established by the NIC of FIG. 16.

Referring now to FIG. 17, the NIC 1614 of the compute device 1600 of FIG. 16 may establish an environment 1700 during operation. The illustrative environment 1700 includes a network interface 1702, a memory fabric interface 1704 of a memory fabric 1706, a flexible packet processor (FXP) 1708, one or more accelerator agents 1710, a traffic manager 1712, the host interface 1714, an infrastructure 1716, one or more on-die processing cores 1718, a memory steering unit 1720, an SRAM 1722, and one or more memory controllers 1724 communicatively coupled to DDR SDRAM 1726. The various components of the environment 1700 may be embodied as hardware, firmware, software, or a combination thereof. As such, in some embodiments, one or more of the components of the environment 1700 may be embodied as circuitry or collection of electrical devices. Additionally, in some embodiments, one or more of the illustrative components may form a portion of another component and/or one or more of the illustrative components may be independent of one another.

The network interface 1702 is configured to receive inbound network traffic and route/transmit outbound network traffic. To facilitate the receipt of inbound and transmission of outbound network communications (e.g., network traffic, network packets, network packet flows, etc.) to/from the compute device 1600, the network interface 1702 is configured to manage (e.g., create, modify, delete, etc.) connections to physical and virtual network ports (i.e., virtual network interfaces) of the NIC 1614, as well as the ingress/egress buffers/queues associated therewith. The network interface 1702 is additionally configured to coordinate with the memory fabric interface 1704 to store the contents (e.g., header(s), payload, footer(s), etc.) of network packets received at the network interface 1702 to the memory fabric 1706.

It should be appreciated that the memory fabric 1706 includes multiple memory storage components (not shown) referred to herein as segments, each of which are usable to support the distributed storage of the contents of a network packet. Accordingly, it should be appreciated that the memory fabric interface 1704 is configured to manage the data writes to the segments in a distributed fashion and provide an indication (e.g., a pointer) usable to identify the storage locations of the segments in which the contents of each network packet has been stored. Additionally, the memory fabric interface 1704 is configured to notify the FXP 1708 when a network packet has been stored in the memory fabric 1706 and provide the memory fabric location pointer(s) to the FXP 1708.

The one or more accelerator agents 1710 are configured to perform an acceleration operation on at least a portion of a network packet. For example, the accelerator agents 1710 may include a remote direct memory access (RDMA) operation, a cryptography operation, or any other type of acceleration. The traffic manager 1712 is configured to perform traffic-management in the packet-processing data path, such as may be performed to enforce service-level agreements (SLAs). As will be described in additional detail below, the traffic manager 1712 is configured to throttle the transmission of network packets from the host CPU(s) to the wire.

The one or more on-die cores 1718 are configured to perform computations local to the NIC 1614. Accordingly, the on-die cores 1718 can provide computational power to perform certain operations without the data being operated on having to be moved to a location remote of the NIC 1614, thereby eliminating the latency otherwise introduced by moving the data. The infrastructure 1716 may include various components to manage the communications, state, and controls of the on-die cores 1718 and/or the host interface 1714, such as a serial communication interface (e.g., a universal asynchronous receiver and transmitter (UART), a serial peripheral interface (SPI) bus, etc.), a testing/debugging interface, a digital thermal sensor, I/O controllers, etc.

The SRAM 1722 is communicatively coupled to the on-die cores 1718 via a memory steering unit 1720 and may be used to store data (e.g., work queues, notifications, interrupts, headers, descriptors, critical structures, etc.) for the on-die cores 1718. Additionally, the memory steering unit 1720 is also coupled to one or more memory controllers 1724. The memory controllers 1724 may be double data rate (DDR) memory controllers configured to drive the DDR SDRAM 1726 external to, but managed by the NIC 1614, rather than the host CPUs (e.g., the processor(s) 1604 of the compute engine 1602 of FIG. 16). Accordingly, accesses to the DDR SDRAM 1726 are faster relative to accesses to the DDR SDRAM 1730 (i.e., host memory) of the host CPUs 1728. The memory controllers 1724 are additionally communicatively coupled to the memory fabric 1706 via the memory fabric interface 1704, such that data stored in the DDR SDRAM 1726 can be transferred to/from the memory fabric 1706.

The host interface 1714 may be embodied as any type of host interface device capable of performing the functions described herein. The host interface 1714 is configured to function as an interface between each of the host CPUs 1728 (e.g., each of the processors 1604 of the compute engine 1602 of FIG. 16) and the NIC 1614. As illustratively shown, the host interface 1714 is configured to function as an interface between the host CPUs 1728 (e.g., one of the processors 1604 of the compute engine 1602 of FIG. 16) and the memory fabric 1706 (e.g., via the memory fabric interface 1704), as well as function as an interface between the host CPUs 1728 and the infrastructure 1716. Accordingly, messages and/or network packet data may be passed therebetween via one or more communication links, such as PCIe interconnects, to provide access to the host memory 1730 (e.g., the memory 1606 of the compute engine 1602 of FIG. 16).

Figure 18:
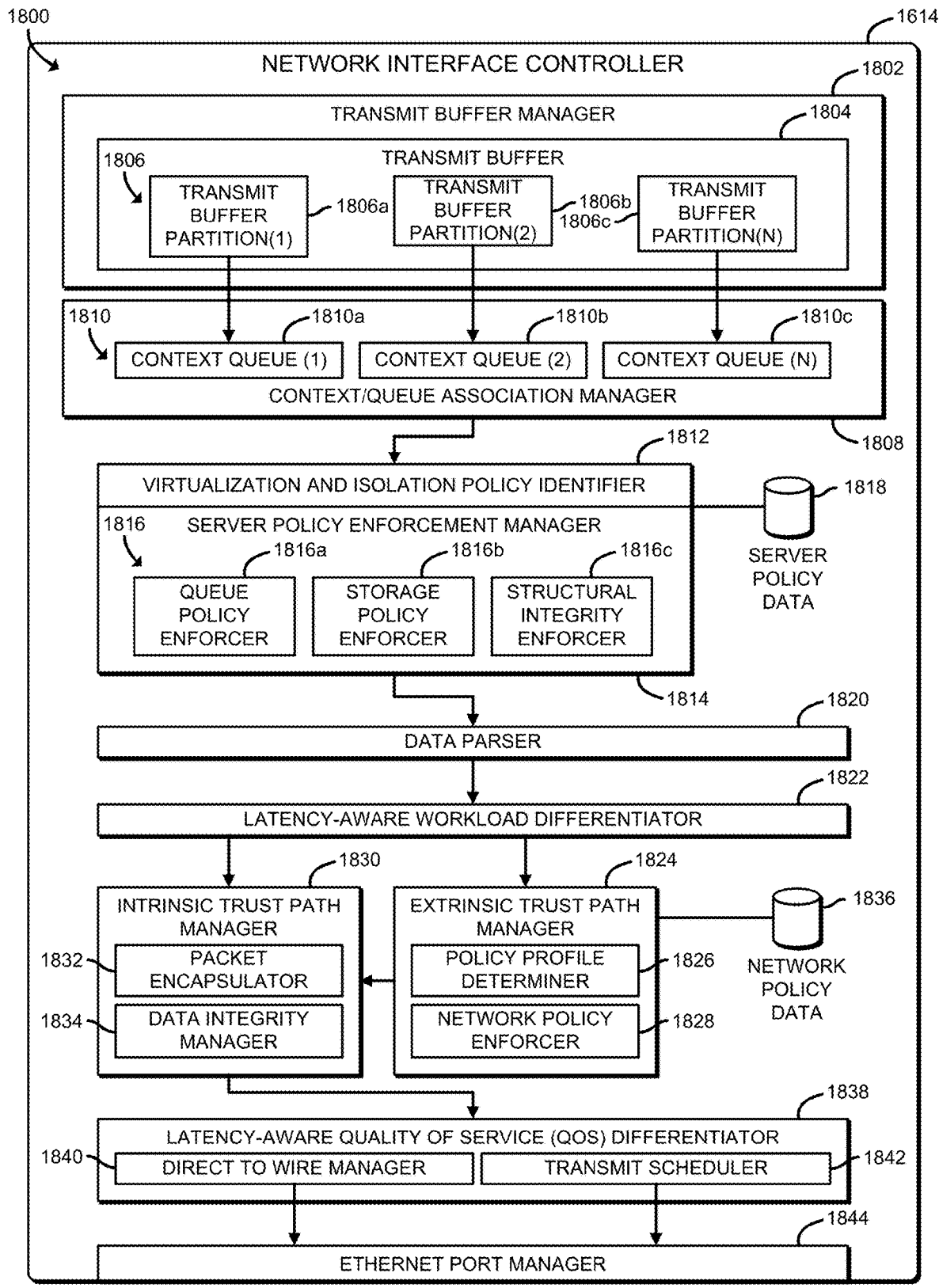
FIG. 18 is a simplified block diagram of at least one other embodiment of an environment of a latency-efficient pipeline that may be established by the NIC of FIGS. 16 and 17.

Referring now to FIG. 18, the NIC 1614 of FIGS. 16 and 17 may establish an environment 1800 during operation. The illustrative environment 1800 includes a transmit buffer manager 1802, a context/queue association manager 1808, a virtualization and isolation policy identifier 1812, a server policy enforcement manager 1814, a data parser 1820, a latency-aware workload differentiator 1822, an extrinsic trust path manager 1824, an intrinsic trust path manager 1830, a latency-aware QoS differentiator 1838, and an Ethernet port manager 1844. The various components of the environment 1800 may be embodied as physical and/or virtual hardware, firmware, software, or a combination thereof. As such, in some embodiments, one or more of the components of the environment 1800 may be embodied as circuitry or collection of electrical devices (e.g., transmit buffer management circuitry 1802, context/queue association management circuitry 1808, virtualization and isolation policy identification circuitry 1812, server policy enforcement management circuitry 1814, data parsing circuitry 1820, latency-aware workload differentiation circuitry 1822, extrinsic trust path management circuitry 1824, intrinsic trust path management circuitry 1830, latency-aware workload differentiation circuitry 1838, Ethernet port management circuitry 1844, etc.).

Additionally, in some embodiments, one or more of the illustrative components may form a portion of another component and/or one or more of the illustrative components may be independent of one another. It should be appreciated that, in such embodiments, one or more of the transmit buffer management circuitry 1802, the context/queue association management circuitry 1808, the virtualization and isolation policy identification circuitry 1812, the server policy enforcement management circuitry 1814, data parsing circuitry 1820, the latency-aware workload differentiation circuitry 1822, the extrinsic trust path management circuitry 1824, the intrinsic trust path management circuitry 1830, the latency-aware workload differentiation circuitry 1838, and the Ethernet port management circuitry 1844 may form a portion of one or more of the compute engine 1602, the one or more data storage devices 1610, the communication circuitry 1612, and/or any other components of the NIC 1614.

In the illustrative embodiment, the environment 1800 additionally includes server policy data 1818 and network policy data 1836, each of which may be embodied as any data established by the compute device 1600. The server policy data 1818 may include any data usable to identify a server policy and/or provide instructions usable to enforce a server policy. Each server policy defines a set of rules (e.g., conditions, constraints, settings, etc.) on the interface between the compute device 1600 and the NIC 1614. It should be appreciated that the server policies serve to ensure that software running on the compute device 1600 does not perform malicious actions. For example, one such malicious action includes a tenant software running on a particular VM that can bring down services on the NIC 1614 for the whole compute device 1600, which can affect other tenants of the compute device 1600. As such, the server policies are intended to enforce queue usage, ensure that VMs are only using those queues allocated to the respective VMs, ensure that the VM does not attempt to use buffer storage that belongs to another VM, ensure that each VM is sending correct data structures, etc.

The network policy data 1836 may include any data usable to identify a network policy and/or provide instructions usable to enforce a network policy. Each network policy defines a set of rules (e.g., conditions, constraints, settings, etc.) that designate which software entities and/or hardware resources are authorized to access particular resources of the NIC 1614 and the circumstances under which the software entities and/or hardware resources can or cannot access the resources of the NIC 1614.

The transmit buffer manager 1802, which may be embodied as hardware, firmware, software, virtualized hardware, emulated architecture, and/or a combination thereof as discussed above, is configured to manage the transmit buffer 1804. The transmit buffer 1804 may be embodied as a virtualized server-mapped buffer associated with a host interface (e.g., the host interface 1714) of the NIC 1614, such that the PCIe transaction overhead involved with typical Ethernet NIC transmit ring-buffers may be reduced. To manage the transmit buffer 1804, the transmit buffer manager 1802 is configured to allow flexible partitioning of a transmit buffer 1804 to software entities, such VMs, software applications, VFs, containers, and PFs, while preserving and enforcing protection and isolation between the different software applications using the resource(s) of the NIC 1614. In other words, the transmit buffer manager 1802 is configured to partition the transmit buffer 1804 into multiple transmit buffer partitions 1806, such as may be requested by a software entity (e.g., one of a VM, a software application, a VF, a PF, or a container). The transmit buffer manager 1802 is additionally configured to map each partition of the transmit buffer of the NIC 1614 to a contiguous virtual address region associated with the respective software entity which the associated partition serves.

As illustratively shown, the transmit buffer partitions 1806 of the transmit buffer 1804 include a first transmit buffer partition, designated as transmit buffer (1) partition 1806a, a second transmit buffer partition, designated as transmit buffer (2) partition 1806b, and a third transmit buffer partition, designated as transmit buffer (N) partition 1806c (e.g., in which the transmit buffer (N) partition 1806c represents the "Nth" transmit buffer partition and "N" is a positive integer). In an illustrative example, each of the transmit buffer partitions 1806 may represents a partition of the transmit buffer 1804 which has been allocated by the transmit buffer manager 1802 to an associated VM (not shown) that is mapped into the VM address space. It should further be appreciated that, in other embodiments, additional and/or alternative transmit buffer partitions may be allocated for a software application, a VF, a PF, a container, etc.

The context/queue association manager 1808 is configured to manage the context/queues associated with the data (i.e., associated with a fast path transaction) to be transmitted of each transmit buffer partition 1806. To do so, the context/queue association manager 1808 is configured to associate a context with the data from the transmit buffer partitions 1806 and queue the data into the applicable context queue 1810 as a function of the context. To identify the context, the context/queue association manager 1808 is configured to extract one or more attributes of the fast path transaction and/or the data associated with the fast path transaction (i.e., stored in a transmit buffer partition 1806). The attributes may include any type of data usable to identify a context of the data, such as a source of the data (e.g., a trusted environment, an untrusted environment, etc.), any attribute that would allow the NIC 1614 to select the latency-optimized processing path (e.g., whether the packet is IPv4 or IPv6, whether the packet contains overlay headers or not, etc.), etc.

The illustrative context queues 1810 include a first context queue, designated as context queue (1) 1810*a*, a second context queue, designated as context queue (2) 1810*b*, and a third context queue, designated as context queue (3) 1810*c*. Upon associating the applicable context and queuing the data in the applicable context queue, the context/queue association manager 1808 may be additionally configured to provide an indication to a packet processor (e.g., the FXP 1708 of FIG. 17) indicating the data may be transmitted to a memory fabric (e.g., the memory fabric 1706) of the NIC 1614.

It should be appreciated that, under certain conditions, a software entity can be flagged as "untrusted" by configuration in the NIC 1614. Accordingly, the virtualization and isolation policy identifier 1812, which may be embodied as hardware, firmware, software, virtualized hardware, emulated architecture, and/or a combination thereof as discussed above, is configured to identify a trust (e.g., a trust level, a trusted/untrusted designation, etc.) associated with data in the latency-efficient pipeline retrieved from or forwarded by the context/queue association manager 1808. To do so, the virtualization and isolation policy identifier 1812 is configured to analyze the attributes associated with the data and/or the fast path transaction (i.e., metadata of the data, the request, etc.). The virtualization and isolation policy identifier 1812 is additionally configured to determine policies which are to be enforced on the data as a function of the identified trust. For example, the virtualization and isolation policy identifier 1812 may be configured to perform a lookup operation on a server policy table (e.g., stored in the server policy data 1818), the result of which may identify the one or more server polices that are to be enforced upon the data.

The server policy enforcement manager 1814, which may be embodied as hardware, firmware, software, virtualized hardware, emulated architecture, and/or a combination thereof as discussed above, is configured to enforce the identified server policies (e.g., identified by the virtualization and isolation policy identifier 1812). Accordingly, malicious and/or erroneous transactions initiated by a software entity on the host can be captured by the NIC 1614 and discarded. Additionally, the server policy enforcement manager 1814 may be configured to report any detected malicious and/or erroneous transactions as an error to a management entity (e.g., the applicable PF).

To do so, the server policy enforcement manager 1814 includes one or more server policy enforcers 1816. As illustratively shown, the server policy enforcement manager 1814 includes multiple illustrative server policy enforcers a queue policy enforcer 1816*a*, a storage policy enforcer 1816*b*, and a structural integrity enforcer 1816*c*. It should be appreciated that additional, fewer, and/or alternative server policies may be enforced, in other embodiments. The queue policy enforcer 1816*a* is configured to ensure that each software entity is only allowed access to queue context resources which are mapped to that software entity. The storage policy enforcer 1816*b* is configured to ensure that the software entity does not exceed the buffer storage limits defined by the applicable queue policy. The structural integrity enforcer 1816*c* is configured to enforce a structural integrity of the data and metadata items conveyed from the software entity.

The data parser 1820, which may be embodied as hardware, firmware, software, virtualized hardware, emulated architecture, and/or a combination thereof as discussed above, is configured to parse the data retrieved from the transmit buffer 1804. It should be appreciated that the data parser 1820 may be configured to fetch the data (e.g., from the memory fabric 1706) for parsing. The data parser 1820 is additionally configured to identify one or more characteristics of the data as a function of the parsed data. In other words, the data parser 1820 is configured to parse the data and analyze the parsed data to identify the data characteristics. Such data characteristics may include any property of the data usable to identify a data characteristic, such as a workload type associated with the data.

The latency-aware workload differentiator 1822, which may be embodied as hardware, firmware, software, virtualized hardware, emulated architecture, and/or a combination thereof as discussed above, is configured to determine a trust (i.e., an intrinsic trust or an extrinsic trust) of the data as a function of the context (e.g., based on the context queue to which the data was previously associated) and/or workload corresponding to the data. Additionally, the latency-aware workload differentiator 1822 is configured to determine whether the data is to be subject to or bypass the network policy enforcement stage of the latency-efficient pipeline as a function of the determined trust.

The extrinsic trust path manager 1824, which may be embodied as hardware, firmware, software, virtualized hardware, emulated architecture, and/or a combination thereof as discussed above, is configured to manage a network policy enforcement stage of the latency-efficient pipeline. To do so, the illustrative extrinsic trust path manager 1824 includes a policy profile determiner 1826 and a network policy enforcer 1828. The policy profile determiner 1826 is configured to identify the policy profile associated with the data such that the application network policies can be identified therefrom. To do so, the policy profile determiner 1826 is configured to identify the context queue through which the data arrived at the NIC 1614 (i.e., via the applicable transmit buffer partition 1806), an identity of the software entity corresponding to the data, and a result (i.e., data characteristics) of the analysis performed on the data by the data parser 1820. The network policy enforcer 1828 is configured to enforce the network policies associated with the determined policy profile (i.e., determined by the policy profile determiner 1826). To do so, the network policy enforcer 1828 is configured to perform a lookup operation of the policy profile on a network policy table (e.g., stored in the network policy data 1836). Accordingly, the network policy enforcer 1828 may identify the one or more network polices which are to be enforced as a result of the lookup operation.

The intrinsic trust path manager 1830, which may be embodied as hardware, firmware, software, virtualized hardware, emulated architecture, and/or a combination thereof as discussed above, is configured to manage an intrinsic trust path for the data traversing the latency-efficient pipeline. As noted previously, the intrinsic trust path manager 1830 provides a path to bypass the network policy enforcement stage (i.e., managed by the extrinsic trust path manager 1824) of the latency-efficient pipeline for an even further reduction in latency. It should be appreciated that, in the latency-efficient pipeline, the data processed by the extrinsic trust path manager 1824 is then processed by the intrinsic trust path manager 1830.

The illustrative intrinsic trust path manager 1830 includes a packet encapsulator 1832 and a data integrity manager 1834. The packet encapsulator 1832 is configured to encapsulate the data into a network packet which includes the applicable header(s) for transmission to the appropriate compute device 1600. The data integrity manager 1834 is configured to include applicable data integrity code, such as a cyclic-redundancy check (CRC) or checksum (e.g., to a footer of the network packet).

In an illustrative example, the data parser 1820 may determine that the data corresponds to a high-performance computing workload run in a trusted environment. Under such conditions, the latency-aware workload differentiator 1822 may determine the trust corresponds to an intrinsic trust. As such, the data may bypass the network policy enforcement stage, which can reduce the amount of overhead associated with the network policy checks and validations, and as such result in lower latency relative to data processed at the network policy enforcement stage. In another illustrative example, the data parser 1820 may determine that the workload was received from a tenant application run in an untrusted public cloud environment. Under such conditions, the latency-aware workload differentiator 1822 may determine the trust corresponds to an extrinsic trust. As such, the data should be subject to the network policy enforcement stage befitting the desired level of security required for such a workload.

The latency-aware QoS differentiator 1838, which may be embodied as hardware, firmware, software, virtualized hardware, emulated architecture, and/or a combination thereof as discussed above, is configured to determine a QoS differentiator associated with the data. The QoS differentiator may include any data usable by the latency-aware QoS differentiator 1838 to determine a network traffic priority of the data. For example, the QoS differentiator may be a latency priority (e.g., based on a guaranteed latency bound) associated with the data, such as may be defined by a service level agreement (SLA). Additionally, the latency-aware QoS differentiator 1838 is configured to determine, as a function of the latency-related QoS differentiator, whether the network packet is either to be transmitted directly to the wire (e.g., via the direct to wire manager 1840) or serviced by a transmit scheduler 1842. The transmit scheduler 1842 is configured to schedule and transmit the network packet in accordance with a scheduling policy defined for the transmit path (e.g., as dictated by the traffic manager 1712 of the NIC 1614).

The Ethernet port manager 1844, which may be embodied as hardware, firmware, software, virtualized hardware, emulated architecture, and/or a combination thereof as discussed above, is configured to manage the Ethernet ports for transmitting the network packets on the applicable wire of a network interface (e.g., the network interface 1702) of the NIC 1614. To do so, the Ethernet port manager 1844 is configured to identify a target compute device (i.e., a next hop, a destination compute device, etc.), identify a port associated with the target compute device, and place the network packet on the wire associated with the identified port.

Figure 19A:
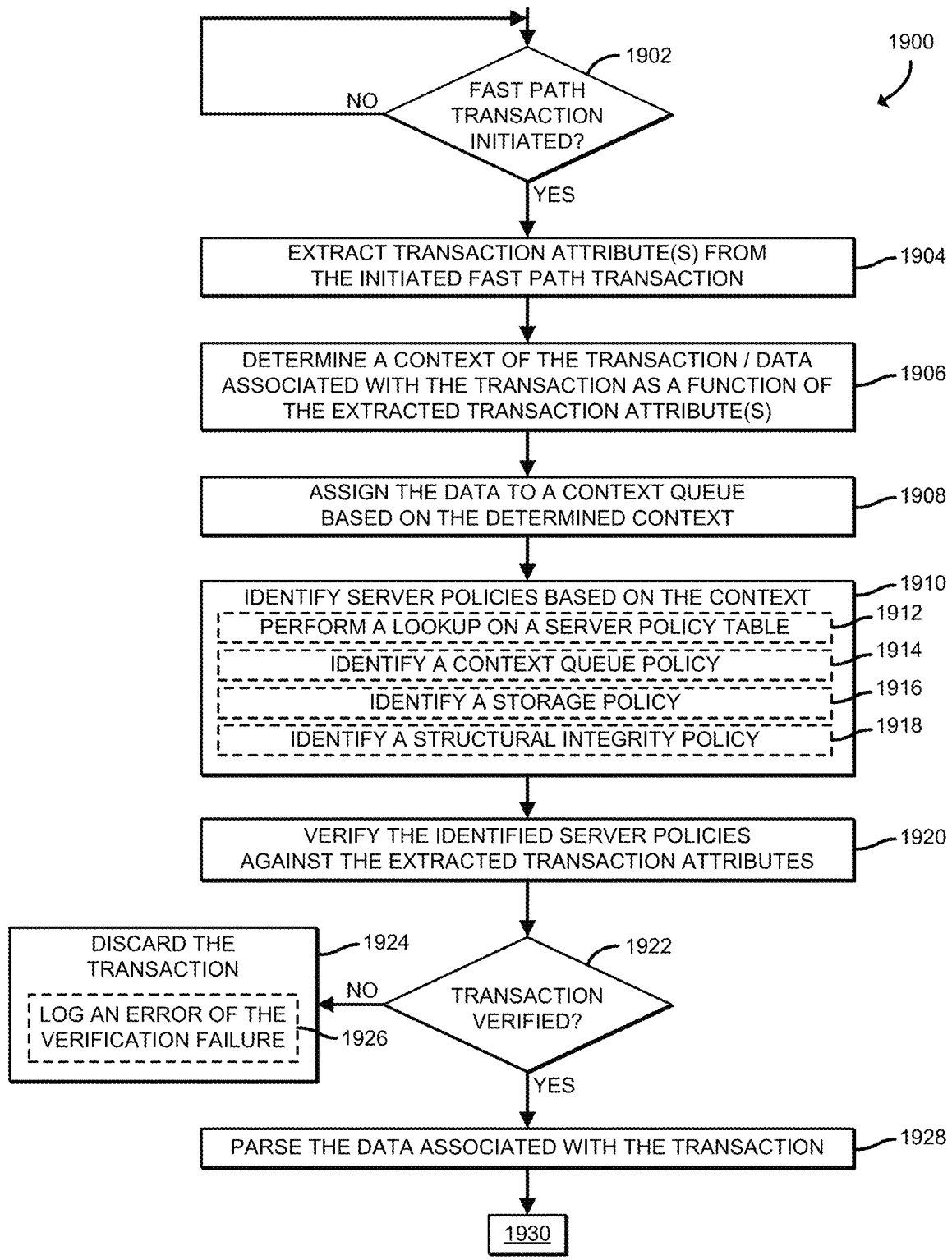
FIGS. 19A and 19B are a simplified flow diagram of at least one embodiment of a method for managing a latency-efficient pipeline through a NIC that may be performed by the NIC of FIGS. 16 and 17.
Figure 19B:
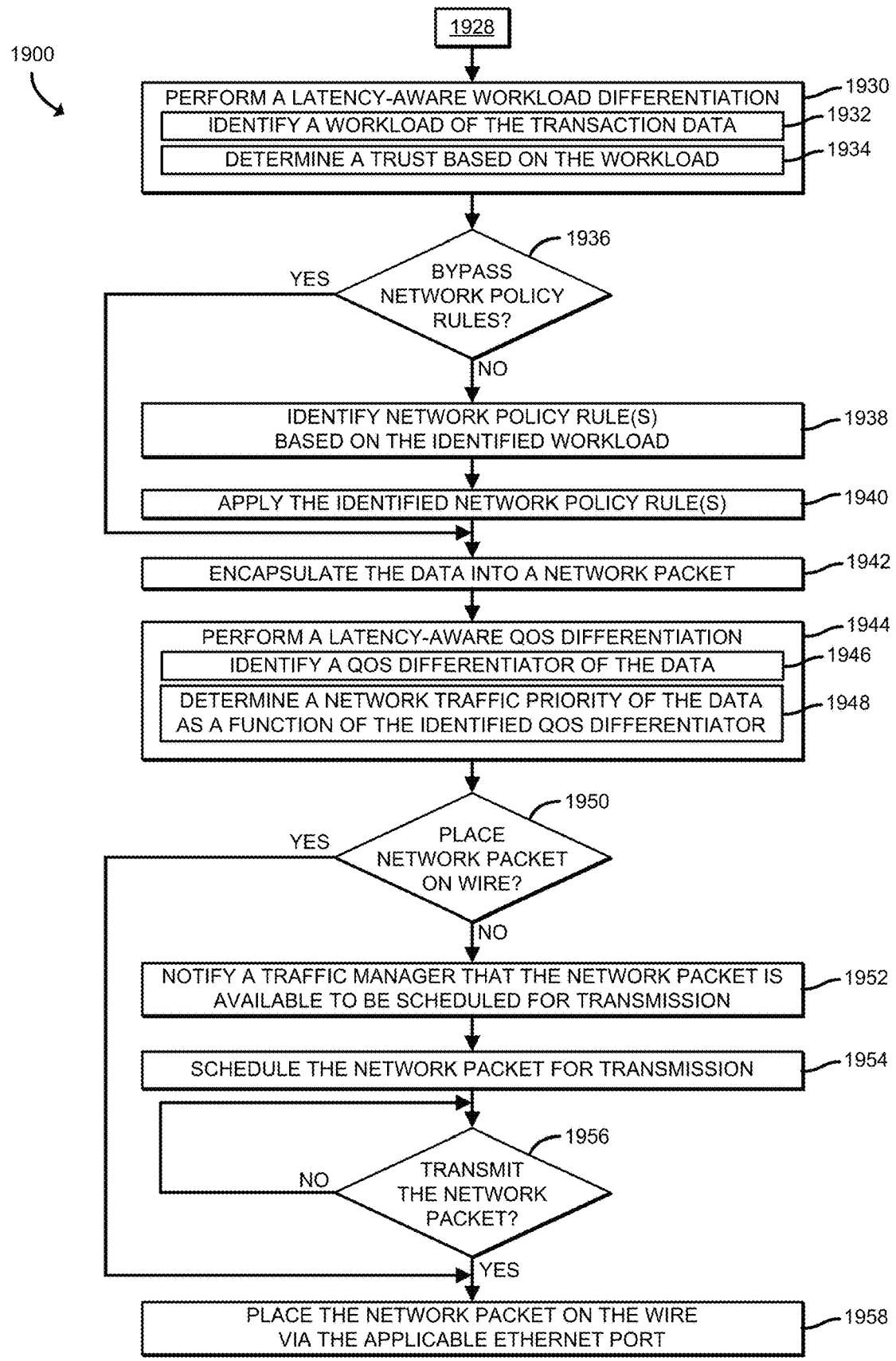

Referring now to FIGS. 19A and 19B, in use, the compute device 1600, or more particularly the NIC 1614 of the compute device 1600, may execute a method 1900 for managing a latency-efficient pipeline through the NIC 1614. The method 1900 begins in block 1902, in which the NIC 1614 (e.g., via a host interface of the NIC 1614) determines whether a fast path transaction (i.e., a latency-sensitive transaction) was initiated which includes latency-sensitive data. As described previously, a fast path transaction may be initiated by a software entity, such as a software application presently executing on a host CPU (e.g., one of the host CPUs 1728 of FIG. 17), a VM on which a workload is being processed, etc. If so, the method 1900 advances to block 1904, in which the NIC 1614 extracts attributes from the transaction (i.e., transaction attributes). The attributes may include any data usable to determine a context of the transaction request (e.g., the source software entity) and/or the data itself (e.g., a workload type, a size of the data, etc.).

In block 1906, the NIC 1614 (e.g., via the host interface 1714) determines a context of the transaction and/or data associated with the transaction as a function of the extracted transaction attribute(s). In block 1908, the NIC 1614 assigns the data of the transaction to a context queue based on the determined context. In block 1910, the NIC 1614 identifies one or more server policies as a function of the determined context (e.g., as a function of the associated context queue). To do so, in block 1912, the NIC 1614 may perform a lookup operation on a server policy table to identify the one or more server policies. For example, in block 1914, the NIC 1614 may identify a context queue policy usable to determine the access allowed to queue context resources mapped to the software entity associated with the data. In another example, in block 1916, the NIC 1614 may identify a storage policy usable to determine buffer storage limits defined by the applicable queue policy. In still another example, in block 1918, the NIC 1614 may identify a structural integrity policy usable to determine an expected structural integrity of the data and metadata items conveyed from the software entity.

In block 1920, the NIC 1614 verifies each of the identified server policies against at least a portion of the extracted transaction attributes. In block 1922, the NIC 1614 determines whether the transaction has been verified. In other words, the NIC 1614 determines whether the server policies enforced against the transaction attributes have verified the transaction. If not, the method 1900 branches to block 1924, in which the NIC 1614 discards the transaction. In some embodiments, in block 1926, the NIC 1614 may additionally log an error of the verification failure along with any pertinent details and/or notify the initiating software entity. If the NIC 1614 successfully verifies the transaction, the method 1900 branches to block 1928, in which the NIC 1614 parses the data associated with the transaction.

In block 1930, as shown in FIG. 19B, the NIC 1614 (e.g., via the packet processor) performs a latency-aware workload differentiation on the parsed data. To do so, in block 1932, the NIC 1614 identifies a workload of the transaction data. Additionally, in block 1934, the NIC 1614 determines a trust based on the identified workload. For example, the trust may be an intrinsic trust (e.g., the workload was run in a trusted environment) or an extrinsic trust (e.g., the workload was run in an untrusted environment). In some embodiments, additional information may be used to identify the trust, such as the context and/or another attribute of the parsed data. In block 1936, the NIC 1614 determines whether to bypass the network policy rules as a function of the identified trust. In an illustrative example, the NIC 1614 determines whether the identified trust corresponds to an intrinsic trust, for which the corresponding data does not need to be subject to the network policy rules, or an extrinsic trust, for which the corresponding data does need to be subjected to the network policy rules.

Accordingly, if the NIC 1614 determines that the network policy rules cannot be bypassed (e.g., the trust corresponds to an extrinsic trust), the method 1900 advances to block 1938, in which the NIC 1614 (e.g., via the packet processor) identifies one or more network policy rules to be applied to the transaction data based on the identified workload. As described previously, each of the network policies defines a set of rules (e.g., conditions, constraints, settings, etc.) that designate which software entities and/or hardware resources are authorized to access particular resources of the NIC 1614 and the circumstances under which the software entities and/or hardware resources can or cannot access resources of the NIC 1614. For example, the NIC 1614 may perform a lookup operation on a network policy rules table using a workload type, or some other identifying characteristic, such as the context. In block 1940, the NIC 1614 applies the applicable network policy rules against the data associated with the transaction. Alternatively, if the NIC 1614 determines that the network policy rules can be bypassed (e.g., the trust corresponds to an intrinsic trust), the method 1900 jumps to block 1942, in which the NIC 1614 encapsulates the data into a network packet. Additionally, in some embodiments, in block 1942, the NIC 1614 may add data integrity code (e.g., a checksum, CRC, etc.) to the network packet.

In block 1944, the NIC 1614 performs a latency-aware QoS differentiation on the network packet to determine whether the network packet is to be transmitted directly to the wire (e.g., for transmission to another compute device, a network computing device, etc.) or scheduled by a scheduler of the NIC 1614. To do so, in block 1946, the NIC 1614 identifies a QoS differentiator of the data. As described previously, the QoS differentiator may define any data usable to determine a network traffic priority of the data, such as a latency priority based on a guaranteed latency bound defined by a service level agreement (SLA). Additionally, in block 1948, the NIC 1614 determines a network traffic priority of the data as a function of the identified QoS differentiator. In block 1950, the NIC 1614 determines whether the network packet should be placed directly on the wire for transmission based on a result of the latency-aware QoS differentiation. If the NIC 1614 determines that the network packet is to be placed directly on the wire, the method 1900 advances directly to block 1958, in which the NIC 1614 places the network packet on the wire via the applicable Ethernet port.

Otherwise, if the NIC 1614 determines the network packet is to be scheduled, the method 1900 advances to block 1952. In block 1952, the NIC 1614 notifies a traffic manager (e.g., the traffic manager 1712 of FIG. 17) that the network packet is available to be scheduled for transmission on the wire. In block 1954, the NIC 1614 schedules the network packet for transmission (e.g., based on a scheduling policy defined for the transmit path). In block 1956, the NIC 1614 determines whether to transmit the network packet (e.g., via the network interface 1702 of FIG. 17). If so, the method 1900 advances to block 1958, in which, as described previously, the NIC 1614 places the network packet on the wire via the applicable Ethernet port.

EXAMPLES

Illustrative examples of the technologies disclosed herein are provided below. An embodiment of the technologies may include any one or more, and any combination of, the examples described below.

Example 1 includes a compute device for processing network packets, the compute device comprising a compute engine having one or more processors and a memory; and a network interface controller (NIC) having a host interface, a packet processor, and a network interface, wherein the NIC is to receive, by the host interface, a transaction from the compute engine, wherein the transaction includes latency-sensitive data; determine, by the host interface, a context of the latency-sensitive data; verify, by the host interface, the latency-sensitive data against one or more server policies as a function of the determined context, wherein each of the one or more server policies include a set of rules usable to a identify whether the application is authorized to access one or more resources of the NIC; identify, by the packet processor, a trust associated with the latency-sensitive data; determine, by the packet processor, whether to verify the latency-sensitive data against one or more network policies as a function of the identified trust, wherein each of the one or more network policies include a set of rules usable to ensure malicious actions are not being undertaken by the application; apply, by the packet processor and in response to a determination to verify the latency-sensitive data against the one or more network policies, the one or more network policies; encapsulate, by the packet processor and subsequent to having successfully applied the one or more network policies, the latency-sensitive data into a network packet; and transmit, by the network interface, the network packet via an associated network port of the NIC.

Example 2 includes the subject matter of Example 1, and wherein to receive the transaction includes to store the latency-sensitive data in a partition of a transmit buffer of the NIC.

Example 3 includes the subject matter of any of Examples 1 and 2, and wherein the NIC is further to enqueue the latency-sensitive data in one of a plurality of context queues based on the determined context.

Example 4 includes the subject matter of any of Examples 1-3, and wherein to determine the context of the latency-sensitive data comprises to (i) extract one or more transaction attributes from the transaction and (ii) determine the context as a function of the extracted one or more transaction attributes.

Example 5 includes the subject matter of any of Examples 1-4, and wherein to verify the one or more server policies comprises to perform a lookup on a server policy table as a function of the determined context to identify the one or more server policies and verifying the one or more identified server policies against at least a portion of the latency-sensitive data.

Example 6 includes the subject matter of any of Examples 1-5, and wherein to identify the trust associated with the latency-sensitive data comprises to (i) parse the latency-sensitive data and (ii) analyze the parsed latency-sensitive data to identify a workload type of the latency-sensitive data.

Example 7 includes the subject matter of any of Examples 1-6, and wherein to determine whether to verify the latency-sensitive data against the one or more network policies comprises to perform a lookup on a network policy table as a function of the workload type to identify the one or more network policies.

Example 8 includes the subject matter of any of Examples 1-7, and wherein the trust comprises one of an extrinsic trust or an intrinsic trust.

Example 9 includes the subject matter of any of Examples 1-8, and wherein the trust is identified as a function of an environment in which the application is presently being executed.

Example 10 includes the subject matter of any of Examples 1-9, and wherein the trust comprises an intrinsic trust in response to a determination that the environment is a trusted environment.

Example 11 includes the subject matter of any of Examples 1-10, and wherein the trust comprises an extrinsic trust in response to a determination that the environment is an untrusted environment.

Example 12 includes the subject matter of any of Examples 1-11, and wherein the NIC is further to identify, by the packet processor, a quality of service (QoS) differentiator associated with the latency-sensitive data, wherein the QoS differentiator is usable to identify a network traffic priority of the latency-sensitive data, determine, by the packet processor, whether to place the network packet directly on the wire as a function of the QoS differentiator; and notify, by the packet processor and subsequent to the determined determination not to place the network packet directly on the wire, a traffic manager of the NIC that the network packet is available to be scheduled for transmission on the wire via the associated network port of the NIC.

Example 13 includes the subject matter of any of Examples 1-12, and wherein the NIC is further to place, by the network interface and subsequent to the determined determination to place the network packet directly on the wire, the network packet on the wire via the associated network port of the NIC.

Example 14 includes a method for processing network packets by a network interface controller (NIC), the method comprising receiving, by a host interface of the NIC, a transaction from the compute engine, wherein the transaction includes latency-sensitive data; determining, by the host interface, a context of the latency-sensitive data; verifying, by the host interface, the latency-sensitive data against one or more server policies as a function of the determined context, wherein each of the one or more server policies include a set of rules usable to a identify whether the application is authorized to access one or more resources of the NIC; identifying, by a packet processor of the NIC, a trust associated with the latency-sensitive data; determining, by the packet processor, whether to verify the latency-sensitive data against one or more network policies as a function of the identified trust, wherein each of the one or more network policies include a set of rules usable to ensure malicious actions are not being undertaken by the application; applying, by the packet processor and in response to a determination to verify the latency-sensitive data against the one or more network policies, the one or more network policies; encapsulating, by the packet processor and subsequent to having successfully applied the one or more network policies, the latency-sensitive data into a network packet; and transmitting, by a network interface of the NIC, the network packet via an associated network port of the NIC.

Example 15 includes the subject matter of Example 14, and wherein receiving the transaction includes storing the latency-sensitive data in a partition of a transmit buffer of the NIC.

Example 16 includes the subject matter of any of Examples 14 and 15, and further including enqueuing, by the host interface, the latency-sensitive data in one of a plurality of context queues based on the determined context.

Example 17 includes the subject matter of any of Examples 14-16, and wherein determining the context of the latency-sensitive data comprises (i) extracting one or more transaction attributes from the transaction and (ii) determining the context as a function of the extracted one or more transaction attributes.

Example 18 includes the subject matter of any of Examples 14-17, and wherein verifying the one or more server policies comprises performing a lookup on a server policy table as a function of the determined context to identify the one or more server policies and verifying the one or more identified server policies against at least a portion of the latency-sensitive data.

Example 19 includes the subject matter of any of Examples 14-18, and wherein identifying the trust associated with the latency-sensitive data comprises (i) parsing the latency-sensitive data and (ii) analyzing the parsed latency-sensitive data to identify a workload type of the latency-sensitive data.

Example 20 includes the subject matter of any of Examples 14-19, and wherein determining whether to verify the latency-sensitive data against the one or more network policies comprises performing a lookup on a network policy table as a function of the workload type to identify the one or more network policies.

Example 21 includes the subject matter of any of Examples 14-20, and wherein the trust comprises one of an extrinsic trust or an intrinsic trust.

Example 22 includes the subject matter of any of Examples 14-21, and wherein the trust is identified as a function of an environment in which the application is presently being executed.

Example 23 includes the subject matter of any of Examples 14-22, and wherein the trust comprises an intrinsic trust in response to a determination that the environment is a trusted environment.

Example 24 includes the subject matter of any of Examples 14-23, and wherein the trust comprises an extrinsic trust in response to a determination that the environment is an untrusted environment.

Example 25 includes the subject matter of any of Examples 14-24, and further including identifying, by the packet processor, a quality of service (QoS) differentiator associated with the latency-sensitive data, wherein the QoS differentiator is usable to identify a network traffic priority of the latency-sensitive data, determining, by the packet processor, whether to place the network packet directly on the wire as a function of the QoS differentiator; and notifying, by the packet processor and subsequent to the determined determination not to place the network packet directly on the wire, a traffic manager of the NIC that the network packet is available to be scheduled for transmission on the wire via the associated network port of the NIC.

Example 26 includes the subject matter of any of Examples 14-25, and further including placing, by the network interface and subsequent to the determined determination to place the network packet directly on the wire, the network packet on the wire via the associated network port of the NIC.

Example 27 includes one or more machine-readable storage media comprising a plurality of instructions stored thereon that, in response to being executed, cause a compute device to perform the method of any of Examples 14-26.

Example 28 includes a compute device for improving throughput in a network, the compute device comprising one or more processors; and one or more memory devices having stored therein a plurality of instructions that, when executed by the one or more processors, cause the compute device to perform the method of any of Examples 14-26.

Example 29 includes a compute device for processing network packets, the compute device comprising host interface circuitry of a network interface controller (NIC) to receive a transaction from the compute engine, wherein the transaction includes latency-sensitive data, determine a context of the latency-sensitive data, and verify the latency-sensitive data against one or more server policies as a function of the determined context, wherein each of the one or more server policies include a set of rules usable to a identify whether the application is authorized to access one or more resources of the NIC; packet processor circuitry of the NIC to identify a trust associated with the latency-sensitive data, determine whether to verify the latency-sensitive data against one or more network policies as a function of the identified trust, wherein each of the one or more network policies include a set of rules usable to ensure malicious actions are not being undertaken by the application; apply, in response to a determination to verify the latency-sensitive data against the one or more network policies, the one or more network policies, and encapsulate, subsequent to having successfully applied the one or more network policies, the latency-sensitive data into a network packet; and network interface circuitry of the NIC to transmit the network packet via an associated network port of the NIC.

Example 30 includes the subject matter of Example 29, and wherein to receive the transaction includes to store the latency-sensitive data in a partition of a transmit buffer of the NIC.

Example 31 includes the subject matter of any of Examples 29 and 30, and wherein the packet processor circuitry is further to enqueue the latency-sensitive data in one of a plurality of context queues based on the determined context.

Example 32 includes the subject matter of any of Examples 29-31, and wherein to determine the context of the latency-sensitive data comprises to (i) extract one or more transaction attributes from the transaction and (ii) determine the context as a function of the extracted one or more transaction attributes.

Example 33 includes the subject matter of any of Examples 29-32, and wherein to verify the one or more server policies comprises to perform a lookup on a server policy table as a function of the determined context to identify the one or more server policies and verifying the one or more identified server policies against at least a portion of the latency-sensitive data.

Example 34 includes the subject matter of any of Examples 29-33, and wherein to identify the trust associated with the latency-sensitive data comprises to (i) parse the latency-sensitive data and (ii) analyze the parsed latency-sensitive data to identify a workload type of the latency-sensitive data.

Example 35 includes the subject matter of any of Examples 29-34, and wherein to determine whether to verify the latency-sensitive data against the one or more network policies comprises to perform a lookup on a network policy table as a function of the workload type to identify the one or more network policies.

Example 36 includes the subject matter of any of Examples 29-35, and wherein the trust comprises one of an extrinsic trust or an intrinsic trust.

Example 37 includes the subject matter of any of Examples 29-36, and wherein the trust is identified as a function of an environment in which the application is presently being executed.

Example 38 includes the subject matter of any of Examples 29-37, and wherein the trust comprises an intrinsic trust in response to a determination that the environment is a trusted environment.

Example 39 includes the subject matter of any of Examples 29-38, and wherein the trust comprises an extrinsic trust in response to a determination that the environment is an untrusted environment.

Example 40 includes the subject matter of any of Examples 29-39, and wherein the packet processor circuitry is further to identify a quality of service (QoS) differentiator associated with the latency-sensitive data, wherein the QoS differentiator is usable to identify a network traffic priority of the latency-sensitive data, determine whether to place the network packet directly on the wire as a function of the QoS differentiator; and notify, subsequent to the determined determination not to place the network packet directly on the wire, a traffic manager of the NIC that the network packet is available to be scheduled for transmission on the wire via the associated network port of the NIC.

Example 41 includes the subject matter of any of Examples 29-40, and wherein the network interface circuitry is further to place, subsequent to the determined determination to place the network packet directly on the wire, the network packet on the wire via the associated network port of the NIC.

Example 42 includes a compute device for processing network packets, the compute device comprising means for receiving, by a host interface of a network interface controller (NIC) of the compute device, a transaction from the compute engine, wherein the transaction includes latency-sensitive data; means for determining, by the host interface, a context of the latency-sensitive data; means for verifying, by the host interface, the latency-sensitive data against one or more server policies as a function of the determined context, wherein each of the one or more server policies include a set of rules usable to a identify whether the application is authorized to access one or more resources of the NIC; means for identifying, by a packet processor of the NIC, a trust associated with the latency-sensitive data; means for determining, by the packet processor, whether to verify the latency-sensitive data against one or more network policies as a function of the identified trust, wherein each of the one or more network policies include a set of rules usable to ensure malicious actions are not being undertaken by the application; means for applying, by the packet processor and in response to a determination to verify the latency-sensitive data against the one or more network policies, the one or more network policies; means for encapsulating, by the packet processor and subsequent to having successfully applied the one or more network policies, the latency-sensitive data into a network packet; and means for transmitting, by a network interface of the NIC, the network packet via an associated network port of the NIC.

Example 43 includes the subject matter of Example 42, and wherein the means for receiving the transaction includes means for storing the latency-sensitive data in a partition of a transmit buffer of the NIC.

Example 44 includes the subject matter of any of Examples 42 and 43, and further including means for enqueuing, by the host interface, the latency-sensitive data in one of a plurality of context queues based on the determined context.

Example 45 includes the subject matter of any of Examples 42-44, and wherein the means for determining the context of the latency-sensitive data comprises means for extracting one or more transaction attributes from the transaction; and means for determining the context as a function of the extracted one or more transaction attributes.

Example 46 includes the subject matter of any of Examples 42-45, and wherein the means for verifying the one or more server policies comprise means for performing a lookup on a server policy table as a function of the determined context to identify the one or more server policies; and means for verifying the one or more identified server policies against at least a portion of the latency-sensitive data.

Example 47 includes the subject matter of any of Examples 42-46, and wherein the means for performing the latency-aware workload differentiation comprises means for parsing the latency-sensitive data; and means for analyzing the parsed latency-sensitive data to identify a workload type of the latency-sensitive data.

Example 48 includes the subject matter of any of Examples 42-47, and wherein the means for determining whether to verify the latency-sensitive data against the one or more network policies comprises means for performing a lookup on a network policy table as a function of the workload type to identify the one or more network policies.

Example 49 includes the subject matter of any of Examples 42-48, and wherein the trust comprises one of an extrinsic trust or an intrinsic trust.

Example 50 includes the subject matter of any of Examples 42-49, and wherein the trust is identified as a function of an environment in which the application is presently being executed.

Example 51 includes the subject matter of any of Examples 42-50, and wherein the trust comprises an intrinsic trust in response to a determination that the environment is a trusted environment.

Example 52 includes the subject matter of any of Examples 42-51, and wherein the trust comprises an extrinsic trust in response to a determination that the environment is an untrusted environment.

Example 53 includes the subject matter of any of Examples 42-52, and further including means for identifying, by the packet processor, a quality of service (QoS) differentiator associated with the latency-sensitive data, wherein the QoS differentiator is usable to identify a network traffic priority of the latency-sensitive data, means for determining, by the packet processor, whether to place the network packet directly on the wire as a function of the QoS differentiator; and means for notifying, by the packet processor and subsequent to the determined determination not to place the network packet directly on the wire, a traffic manager of the NIC that the network packet is available to be scheduled for transmission on the wire via the associated network port of the NIC.

Example 54 includes the subject matter of any of Examples 42-53, and further including means for placing, by the network interface and subsequent to the determined determination to place the network packet directly on the wire, the network packet on the wire via the associated network port of the NIC.

The invention claimed is:
1. An apparatus comprising:
a network interface controller (NIC) comprising a host interface, a packet processor, and a network interface, wherein the NIC is to:
receive, by the host interface, a transaction from a compute engine, wherein the transaction includes latency-sensitive data;
determine, by the host interface, a context of the latency-sensitive data;
verify, by the host interface, the latency-sensitive data against one or more server policies as a function of the determined context, wherein each of the one or more server policies include a set of rules usable to a identify whether an application is authorized to access one or more resources of the NIC;
identify, by the packet processor, a trust associated with the latency-sensitive data;
determine, by the packet processor, whether to verify the latency-sensitive data against one or more network policies as a function of the identified trust, wherein each of the one or more network policies include a set of rules usable to ensure malicious actions are not being undertaken by the application;
apply, by the packet processor and in response to a determination to verify the latency-sensitive data against the one or more network policies, the one or more network policies;
encapsulate, by the packet processor and subsequent to having successfully applied the one or more network policies, the latency-sensitive data into a network packet; and
transmit, by the network interface, the network packet via an associated network port of the NIC.

2. The apparatus of claim 1, wherein to receive the transaction includes to store the latency-sensitive data in a partition of a transmit buffer of the NIC.

3. The apparatus of claim 1, wherein the NIC is further to enqueue the latency-sensitive data in one of a plurality of context queues based on the determined context.

4. The apparatus of claim 1, wherein to determine the context of the latency-sensitive data comprises to (i) extract one or more transaction attributes from the transaction and (ii) determine the context as a function of the extracted one or more transaction attributes.

5. The apparatus of claim 1, wherein to verify the latency-sensitive data against one or more server policies comprises to perform a lookup on a server policy table as a function of the determined context to identify the one or more server policies and verifying the one or more identified server policies against at least a portion of the latency-sensitive data.

6. The apparatus of claim 1, comprising the compute engine, wherein the compute engine comprises one or more processors and a memory.

7. The apparatus of claim 1, wherein to identify the trust associated with the latency-sensitive data comprises to (i) parse the latency-sensitive data and (ii) analyze the parsed latency-sensitive data to identify a workload type of the latency-sensitive data.

8. The apparatus of claim 7, wherein to determine whether to verify the latency-sensitive data against the one or more network policies comprises to perform a lookup on a network policy table as a function of the workload type to identify the one or more network policies.

9. The apparatus of claim 1, wherein the trust comprises one of an extrinsic trust or an intrinsic trust, and wherein the trust is identified as either the extrinsic trust or the intrinsic trust as a function of an environment in which the application is presently being executed.

10. The apparatus of claim 9, wherein the trust comprises an intrinsic trust in response to a determination that the environment is a trusted environment, and wherein the trust comprises an extrinsic trust in response to a determination that the environment is an untrusted environment.

11. The apparatus of claim 1, wherein the NIC is further to:
    identify, by the packet processor, a quality of service (QoS) differentiator associated with the latency-sensitive data, wherein the QoS differentiator is usable to identify a network traffic priority of the latency-sensitive data,
    determine, by the packet processor, whether to place the network packet directly on a wire as a function of the QoS differentiator; and
    notify, by the packet processor and subsequent to a determination not to place the network packet directly on the wire, a traffic manager of the NIC that the network packet is available to be scheduled for transmission on the wire via the associated network port of the NIC.

12. The apparatus of claim 11, wherein the NIC is further to place, by the network interface and subsequent to a determination to place the network packet directly on the wire, the network packet on the wire via the associated network port of the NIC.

13. One or more non-transitory machine-readable storage media comprising a plurality of instructions stored thereon that, in response to being executed, cause a compute device to:
    receive, by a host interface of a network interface controller (NIC), a transaction from a compute engine, wherein the transaction includes latency-sensitive data;
    determine, by the host interface, a context of the latency-sensitive data;
    verify, by the host interface, the latency-sensitive data against one or more server policies as a function of the determined context, wherein each of the one or more server policies include a set of rules usable to a identify whether an application is authorized to access one or more resources of the NIC;
    identify, by a packet processor of the NIC, a trust associated with the latency-sensitive data;
    determine, by the packet processor, whether to verify the latency-sensitive data against one or more network policies as a function of the identified trust, wherein each of the one or more network policies include a set of rules usable to ensure malicious actions are not being undertaken by the application;
    apply, by the packet processor and in response to a determination to verify the latency-sensitive data against the one or more network policies, the one or more network policies;
    encapsulate, by the packet processor and subsequent to having successfully applied the one or more network policies, the latency-sensitive data into a network packet; and
    transmit, by a network interface of the NIC, the network packet via an associated network port of the NIC.

14. The one or more non-transitory machine-readable storage media of claim 13, wherein to receive the transaction includes to store the latency-sensitive data in a partition of a transmit buffer of the NIC.

15. The one or more non-transitory machine-readable storage media of claim 13, wherein the plurality of instructions further cause the NIC to enqueue the latency-sensitive data in one of a plurality of context queues based on the determined context.

16. The one or more non-transitory machine-readable storage media of claim 13, wherein to determine the context of the latency-sensitive data comprises to (i) extract one or more transaction attributes from the transaction and (ii) determine the context as a function of the extracted one or more transaction attributes.

17. The one or more non-transitory machine-readable storage media of claim 13, wherein to verify the latency-sensitive data against one or more server policies comprises to perform a lookup on a server policy table as a function of the determined context to identify the one or more server policies and verifying the one or more identified server policies against at least a portion of the latency-sensitive data.

18. The one or more non-transitory machine-readable storage media of claim 13, wherein to identify the trust associated with the latency-sensitive data comprises to (i) parse the latency-sensitive data and (ii) analyze the parsed latency-sensitive data to identify a workload type of the latency-sensitive data.

19. The one or more non-transitory machine-readable storage media of claim 18, wherein to determine whether to verify the latency-sensitive data against the one or more network policies comprises to perform a lookup on a network policy table as a function of the workload type to identify the one or more network policies.

20. The one or more non-transitory machine-readable storage media of claim 13, wherein the trust comprises one of an extrinsic trust or an intrinsic trust, and wherein the trust is identified as either the extrinsic trust or the intrinsic trust as a function of an environment in which the application is presently being executed.

21. The one or more non-transitory machine-readable storage media of claim 20, wherein the trust comprises an intrinsic trust in response to a determination that the environment is a trusted environment, and wherein the trust comprises an extrinsic trust in response to a determination that the environment is an untrusted environment.

22. The one or more non-transitory machine-readable storage media of claim 13, wherein the plurality of instructions further cause the NIC to:
    identify, by the packet processor, a quality of service (QoS) differentiator associated with the latency-sensitive data, wherein the QoS differentiator is usable to identify a network traffic priority of the latency-sensitive data,
    determine, by the packet processor, whether to place the network packet directly on a wire as a function of the QoS differentiator; and
    notify, by the packet processor and subsequent to a determination not to place the network packet directly on the wire, a traffic manager of the NIC that the network packet is available to be scheduled for transmission on the wire via the associated network port of the NIC.

23. The one or more non-transitory machine-readable storage media of claim 22, wherein the plurality of instructions further cause the NIC to place, by the network interface and subsequent to a determination to place the network packet directly on the wire, the network packet on the wire via the associated network port of the NIC.

24. A network interface controller (NIC) comprising:
    means for receiving, by a host interface, a transaction from a compute engine, wherein the transaction includes latency-sensitive data;
    means for determining, by the host interface, a context of the latency-sensitive data;
    means for verifying, by the host interface, the latency-sensitive data against one or more server policies as a function of the determined context, wherein each of the one or more server policies include a set of rules usable to a identify whether an application is authorized to access one or more resources of the NIC;

means for identifying, by a packet processor of the NIC, a trust associated with the latency-sensitive data;

means for determining, by the packet processor, whether to verify the latency-sensitive data against one or more network policies as a function of the identified trust, wherein each of the one or more network policies include a set of rules usable to ensure malicious actions are not being undertaken by the application;

means for applying, by the packet processor and in response to a determination to verify the latency-sensitive data against the one or more network policies, the one or more network policies;

means for encapsulating, by the packet processor and subsequent to having successfully applied the one or more network policies, the latency-sensitive data into a network packet; and means for transmitting, by a network interface of the NIC, the network packet via an associated network port of the NIC.

25. The NIC of claim 24, wherein the means for determining the context of the latency-sensitive data comprises (i) means for extracting one or more transaction attributes from the transaction and (ii) means for determining the context as a function of the extracted one or more transaction attributes, and wherein the means for verifying the latency-sensitive data against one or more server policies comprises (i) means for performing a lookup on a server policy table as a function of the determined context to identify the one or more server policies and (ii) means for verifying the one or more identified server policies against at least a portion of the latency-sensitive data.

26. The NIC of claim 24, comprising means for performing latency-aware workload differentiation, the means for performing latency-aware workload differentiation comprises:

means for parsing the latency-sensitive data; and means for analyzing the parsed latency-sensitive data to identify a workload type of the latency-sensitive data, wherein the means for determining whether to verify the latency-sensitive data against the one or more network policies comprises means for performing a lookup on a network policy table as a function of the workload type to identify the one or more network policies.

27. An apparatus comprising:

a network interface controller (NIC) comprising:

circuitry to determine a level of trust of a source of a transaction and based on the level of trust, selecting a path for a packet associated with the transaction from among multiple paths through the NIC, wherein the multiple paths comprises a first path associated with a trusted source and a second path associated with a less trusted source, wherein the first path comprises circuitry to bypass network policy enforcement and provide the packet to be scheduled for transmission to another device and wherein the second path comprises circuitry to enforce a network policy with respect to the packet.

28. The apparatus of claim 27, wherein:

the first path comprises a latency-sensitive path that is to provide the packet to be available for transmission from the NIC and the second path comprises circuitry to perform network policy checks and validations.

29. The apparatus of claim 27, wherein the trusted source comprises a high-performance computing (HPC) workload.

* * * * *